US006934342B1

(12) United States Patent
Ishii et al.

(10) Patent No.: US 6,934,342 B1
(45) Date of Patent: Aug. 23, 2005

(54) AUTOMATIC MODULATION TYPE DISCRIMINATION APPARATUS AND AUTOMATIC MODULATION TYPE DISCRIMINATION METHOD CAPABLE OF DISCRIMINATING PLURAL KINDS OF MODULATION TYPES

(75) Inventors: Hiroyuki Ishii, Tokyo (JP); Masahiro Kuroda, Tokyo (JP); Yoshimitsu Iki, Tokyo (JP)

(73) Assignee: NEC Corporation, Tokyo (JP)

( * ) Notice: Subject to any disclaimer, the term of this patent is extended or adjusted under 35 U.S.C. 154(b) by 656 days.

(21) Appl. No.: 09/659,767

(22) Filed: Sep. 11, 2000

(30) Foreign Application Priority Data

Sep. 9, 1999 (JP) .......................................... 11/256366

(51) Int. Cl.[7] .......................... H03K 9/00; H04L 27/06; H04L 27/14; H04L 27/22

(52) U.S. Cl. ........................ 375/316; 375/224; 455/142

(58) Field of Search ................................ 375/316, 216, 375/217, 224, 222, 228, 320, 322, 324, 329, 332, 334, 330; 455/67.11, 67.13, 142

(56) References Cited

U.S. PATENT DOCUMENTS

| | | | | | |
|---|---|---|---|---|---|
| 5,163,159 | A | * | 11/1992 | Rich et al. | 455/74 |
| 5,251,232 | A | * | 10/1993 | Nonami | 375/216 |
| 5,289,252 | A | * | 2/1994 | Nourrcier | 356/5.09 |
| 5,402,449 | A | * | 3/1995 | Schultes et al. | 375/340 |
| 5,418,815 | A | * | 5/1995 | Ishikawa et al. | 375/216 |
| 5,483,686 | A | * | 1/1996 | Saka et al. | 455/182.2 |
| 5,598,430 | A | * | 1/1997 | Hachisuka et al. | 375/216 |
| 5,600,673 | A | | 2/1997 | Kimura et al. | |
| 5,912,922 | A | | 6/1999 | Koszarsky et al. | |
| 6,091,343 | A | * | 7/2000 | Dykema et al. | 340/825.69 |

FOREIGN PATENT DOCUMENTS

| | | |
|---|---|---|
| JP | 62-22141 | 1/1987 |
| JP | 62-128247 | 6/1987 |
| JP | 2-73749 | 3/1990 |
| JP | 5-218914 | 8/1993 |
| JP | 7-7678 | 1/1995 |
| JP | 10-23086 | 1/1998 |
| JP | 10-267972 | 10/1998 |
| JP | 2000-286908 | 10/2000 |
| JP | 2001-111644 | 4/2001 |

OTHER PUBLICATIONS

Taira et al., "Automatic Classification of Modulation Types, Including Analogue Types", Technical Report of IEICE, Dept. of Electrical Engineering, Faculty of Science and Technology, Keio University, Japan, pp. 29–36 (1998)).

(Continued)

*Primary Examiner*—Jean B. Corrielus
(74) *Attorney, Agent, or Firm*—Dickstein, Shapiro, Morin & Oshinsky, LLP.

(57) ABSTRACT

A analog/digital modulation type discrimination circuit 1 discriminates whether a reception signal is an analog modulation type, a linear modulation type or a non-linear modulation type by digital modulation type. In case where the reception signal is discriminated to be the analog modulation type, an analog modulation type discrimination circuit 2 discriminates whether it is an AM signal or an FM signal among the analog modulation type. In case where the reception signal is discriminated to be the linear modulation type by digital modulation type, a linear modulation type discrimination circuit 3 discriminates whether it is a BPSK signal, a QPSK signal, a π/4-shift QPSK signal, an 8-PSK signal, an M-ary PSK signal of multi-level exceeding 8-levels, a 16 QAM signal or a n M-ary QAM signal of multi-level exceeding 16-levels among the linear modulation type by digital modulation type. In case where the reception signal is discriminated to be the non-linear modulation type by the digital modulation type a non-linear modulation type discrimination circuit 4 discriminates whether it is an M-ary FSK signal, a 2-FSK signal, an MSK signal or a GMSK signal among the non-linear modulation type by the digital modulation type.

36 Claims, 26 Drawing Sheets

OTHER PUBLICATIONS

Taira et al., "Modulation Type Classification Based on the Block Demodulation Method", Technial Report of IEICE, Dept. of Electrical Engineering, Faculty of Science and Technology, Keio University, Japan, pp. 47–54 (1997).

Taira et al., "Block Demodulation Method Coping with Modulation Type Variation", Technical Report of IEICE, Dept. of Electrical Engineering, Faculty of Science and Technology, Keio University, Japan, pp. 7–14 (1997).

Copy of Japanese Office Action dated Feb. 25, 2004 (and English translation of relevant portion).

Dubuc et al., "An Automatic Modulation Recognition Algorithm for Spectrum Monitoring Applications", Communications Research Center, IEEE International Conference on Communications. Conference Record. Vancouver, CA, pp. 570–574 (Jun. 1999).

Portillo–Garcia et al., "A Microcomputer–based General Architecture for Radiocommunictation Signal Classification and Digital Demodulation", Proceedings of the European Signal Processing Conference, Barcelona, Spain, pp. 1919–1922 (Sep. 1990).

* cited by examiner

| CHARACTERISTIC / OBJECT | ANALOG MODULATION TYPE | DIGITAL LINEAR MODULATION TYPE | DIGITAL NON-LINEAR MODULATION TYPE | REMARK |
| --- | --- | --- | --- | --- |
| EXISTENCE/ NONEXISTENCE OF SYMBOL CLOCK | 0 | 1 | 1 | EXISTENCE:1 NON-EXISTENCE: 0 |
| ENVELOPE FLUCTUATION | AM-1<br>FM-0 | 1 | 0 | EXISTENCE:1 NON-EXISTENCE:0 |
| SPECTRUM SHAPE | (AM: TWO SIDE BAND SPECTRUMS SYMMETRICAL ABOUT CARRIER WAVE SPECTRUM | BAND RESTRICTION TYPE SPECTRUM SPECTRUM SHARPLY ATTENUATES | SPECTRUM EXISTS OVER WIDE BAND SPECTRUM ATTENUATES ACCOMPANYING WITH DETUNING OF FREQUENCY | |

FIG. 7

NON-LINEAR MODUALTICN SPECTRUM (2-FSK)

LINEAR MODULATION SPECTRUM

ANALOG MODULATION SPECTRUM

| CHARACTERISTIC / OBJECT | AM | FM | REMARK |
|---|---|---|---|
| EXISTENCE / NON-EXISTENCE OF CARRIER WAVE SPECTRUM | 1 | — | EXISTENCE:1<br>NON-EXISTENCE:0 |
| EXISTENCE / NON-EXISTENCE OF SYMMETRY OF SPECTRUM | 1 | 0 | EXISTENCE:1<br>NON-EXISTENCE:0 |
| SIGNAL BAND WIDTH | 0 | 1 | EXCLUDING NARROW BAND FM.<br>DIFFUSION SPECTRUM :1<br>NON- DIFFUSION SPECTRUM :0 |
| ENVELOPE FLUCTUATION | 1 | 0 | EXISTENCE :1<br>NON- EXISTENCE :0 |

FIG. 9

16QAM

64QAM

○ : SYMBOL CONVERGENCE POSITION OF ( ODD NUMBER )-TH
△ : SYMBOL CONVERGENCE POSITION OF ( EVEN NUMBER )-TH

× : SYMBOL CONVERGENCE POSITION OF ( ODD NUMBER )-TH
(EVEN NUMBER)-TH

AUTOMATIC MODULATION TYPE DISCRIMINATION APPARATUS AND AUTOMATIC MODULATION TYPE DISCRIMINATION METHOD CAPABLE OF DISCRIMINATING PLURAL KINDS OF MODULATION TYPES

BACKGROUND OF THE INVENTION

The present invention relates to an automatic modulation type discrimination apparatus, particularly an automatic modulation type discrimination apparatus and automatic modulation type discrimination method for automatically discriminating a modulation type of a reception signal having unknown communication elements, and to a magnetic recording medium in which a program for operating the apparatus and implementing the method has been recorded.

Hitherto, as to this kind of apparatus for discriminating a modulation type of reception signal, there is, for example, a reception signal discrimination circuit disclosed in U.S. Pat. No. 5,600,673. This recreation signal discrimination circuit is applied to a radio communication system using the same frequency band in a connection communication between isolated islands and an urgent communication in an emergency, and used in order to discriminate an urgent communication signal accurately and at high speed.

The reception signal discrimination circuit mentioned above is explained by referring to FIG. 1. In FIG. 1, the reception signal discrimination circuit includes a clock extraction circuit 111 for extracting a data clock from demodulated reception data. A phase difference measurement circuit 112 measures a phase difference between the data clock extracted by the clock extraction circuit 111 and the demodulated reception data. A deviation calculation circuit 113 calculates a deviation between the phase deviation measured by the phase difference measurement circuit 112 and a reference value for deviation predetermined on the basis of modulation type. A squaring calculation circuit 114 squares the deviation calculated by the deviation calculation circuit 113. An average value calculation circuit 115 calculates an average value of plural numbers of continuous predetermined squared value outputs calculated by the squaring calculation circuit 114. A comparison circuit 116 compares as to which is lager the average value calculated by the average value calculation circuit 115 or a predetermined reference value for determination, and outputs a discrimination signal on the basis of the comparison result.

Next, an operation of the reception signal discrimination circuit is explained. An object of the reception signal discrimination circuit is to discriminate whether or not reception data of a desired modulation type are inputted. Incidentally, a demodulator of the modulation type becoming a discrimination object is placed in a front stage of an input portion of reception data, and the reception signal discrimination circuit performs the discrimination from a clock number for phase difference measurement included in one bit data interval of demodulated reception data. This utilizes a characteristic that, in case where the reception data are reception data of the desired modulation type, a clock number becomes constant but, in case where it is reception data of another modulation type, its value becomes an unstable value.

Accordingly, with this reception signal discrimination circuit, first in case where the reception data other than the desired modulation type are received, it is impossible to specify that modulation type. Further, on discriminating, since it is a premise that the discrimination is performed using the demodulated reception data, it is necessary that communication elements required for demodulating the reception signal is previously known.

Concretely, the reception signal is first demodulated by a demodulator in which the communication elements necessary for the demodulation have been set. Thereafter, the demodulated reception data are inputted to the circuit shown in FIG. 1, and the data clock is extracted by the clock extraction circuit 111. Next, the reception data and the extracted data clock are inputted to the phase difference measurement circuit 112. The phase difference measurement circuit 112 has a phase difference measurement clock of prescribed frequency, which is fixed therein. The phase difference measurement circuit 112 computes a clock number for the phase difference measurement between from a change point of the reception data to a leading edge of a next data clock.

In FIG. 2A to FIG. 2C, there are shown waveform diagrams in case where the reception data of the desired modulation type are inputted. FIG. 3A to FIG. 3C show waveform diagrams in case where the reception data other than the desired modulation type are inputted. FIG. 2A, FIG. 3A show the waveforms of the demodulated reception data, and FIG. 2B, FIG. 3B show the waveforms of the data clock. FIG. 2C, FIG. 3C show waveforms of measured data clock of the phase difference measurement clock.

As apparent from FIG. 2A to FIG. 2C, in case where the reception data of the desired modulation type are inputted as the reception signal, the measured clock number becomes a constant value. However, as shown in FIG. 3A to FIG. 3C, in case where the reception data not modulated by the desired modulation type are inputted, the change point of the reception data becomes random, and also the measured number of the phase difference measurement clock becomes random. From the results mentioned above, it is made possible to determine whether or not the reception data are the desired modulation type.

Incidentally, the deviation calculation circuit 113, the squaring calculation circuit 114 and the average value calculation circuit 115 are calculation circuits used for the purpose of increasing an accuracy when performing the discrimination processing, by utilizing the aforesaid characteristic. The comparison circuit 116 determines, from the inputted calculation result, whether or not the reception signal is a signal by the desired modulation type.

As mentioned above, in the prior art, it is an object to discriminate whether or not the reception data of the desired modulation type are received. Further, for the discrimination processing, the demodulated reception data are used and, in order to obtain this demodulated reception data, there are beforehand required the communication elements necessary for demodulation and the demodulator therefor.

Besides, as to a circuit for discriminating whether or not the reception signal is the desired modulation type, there is a discrimination circuit disclosed in the aforesaid U.S. Pat. No. 5,600,673. This discrimination circuit is shown in FIG. 4. In FIG. 4, this discrimination circuit extracts the clock data from the demodulated reception data by a PPL (Phased Lock Loop) circuit 119, the reception data are decoded in a decoding circuit 117 by the extracted data clock. Subsequently, a synchronous code is detected by a synchronous code detection circuit 118 from the extracted data clock and the decoded data. By using the detected synchronous code, it is discriminated whether or not the reception data are the desired modulation type.

That is, in this discrimination circuit, the discrimination is performed paying attention to the synchronous code after the decoding. Further, the discrimination is only a discrimination as to whether or not it is the desired modulation type. Furthermore, on discriminating, the communication elements (including the synchronous code) for obtaining the synchronous code must be previously known and the demodulator for demodulation is required.

As apparent from the explanation mentioned above, in the conventional modulation type discrimination method, there are problems mentioned below.

A first problem exists in the fact that, with the conventional discrimination circuit mentioned above, it is only possible to discriminate whether or not the reception data are a signal of the desired modulator type. This means that the received reception data of another modulation type do not become an object of the modulation discrimination. Therefore, in case where plural kinds of modulation types are made the discrimination object, an apparatus becomes large-sized, so that it becomes a problem also in terms of a flexibility of the apparatus.

A second problem is the fact that, with the conventional discrimination circuit, the communication elements must be previously known for the discrimination. This is because the data used in the discrimination are the reception data after the demodulation and the synchronous code after the decoding. In order to obtain these data and code, there are beforehand required the communication elements of the modulator type which is the discrimination object and the demodulator in which the communication elements are set. Here, in case where these are not previously known, accurate data used in the discrimination are not obtained, so that it is difficult to perform the discrimination processing.

A third problem is the fact that, in case where the communication elements of the signal which is the discrimination object changes, it is impossible to deal with the change. This is because, with the conventional discrimination circuit, it is a premise that a modulation type is discriminated by the reception data after having been demodulated using the known communication elements. This is also because it does not have a communication wave elements extraction circuit capable of dealing with a change in the communication elements and means for analyzing that change.

A fourth problem is the fact that, with the conventional discrimination circuit, a long time is required for the decoding and the detection of the synchronous code, so that it is impossible to perform the discrimination at high speed. This is because, in the example of FIG. 4, notwithstanding the fact that the synchronous data, i.e., usually data and the like, exist at the beginning of the reception data, it must pass through a detection of the synchronous code existing thereafter.

A fifth problem is the fact that, in case where plural kinds of conventional discrimination circuits are combined and plural kinds of modulation types are made an object of the discrimination, a circuit scale becomes large and complex, so that a necessary calculation amount is greatly increased. This is because, in order that the plural kinds of modulation types are made an object of the discrimination, it is necessary to adopt a constitution in which such a constitution as shown in FIG. 1 is arranged in parallel in plural number.

SUMMARY OF THE INVENTION

A first object of the present invention is to provide a modulation type discrimination apparatus and modulation type discrimination method for automatically analyzing a modulation type of a reception signal having unknown communication wave elements.

A second object of the present invention is to provide a modulation type discrimination apparatus and modulation type discrimination method in which, on discriminating a modulation type of the reception signal, communication elements for preliminarily performing a discrimination processing of the modulation type and a hardware such as demodulator are made unnecessary.

A third object of the present invention is to improve a discrimination accuracy of a modulation type and a performance of the apparatus by using plural parameters (characteristics extracted from the reception signal, which are used for the modulation type discrimination) for modulation type discrimination and performing a weighting processing to the parameters for the discrimination.

A fourth object of the present invention is possible to provide an optimum processing technique by means of, for the reception signal judged to be unknown (unclear) as a result of the discrimination processing of the modulation type, switching to another discrimination processing by using informations obtained from the discrimination processing until that point of time and a backtracking technique, and by means of, by storing the discrimination result of the processed of the modulation type to a storage circuit, comparing and collating it with the stored informations in case where the same unknown reception signal is inputted again.

A fifth object of the present invention is to increase a kind of the signal capable of being dealt with, by a database making of the informations in the storage circuit mentioned above.

A sixth object of the present invention is to provide an apparatus and method for performing, besides the modulation type discrimination processing, a demodulation processing of the reception signal by storing and utilizing the communication elements obtained in a modulation type discrimination processing course of the reception signal.

A seventh object of the present invention is to provide a modulation type discrimination apparatus and modulation type discrimination method, which make it possible, in the modulation type discrimination processing, to perform the discrimination processing without waiting a detection of the modulation data and a detection of the synchronous code.

An eighth object of the present invention is to provide a constitution for improving a reliability of the modulation type discrimination apparatus. With this constitution, a hardware constitution capable of implementing with a high accuracy the discrimination processing of plural kinds of modulation types and a processing technique by a digital signal processing are provided.

According to the present invention, an automatic modulation type discrimination apparatus for receiving a reception signal having unknown communication elements and discriminating a modulation type of the reception signal is provided. The automatic modulation type discrimination apparatus includes an analog/digital modulation type discrimination portion for extracting and analyzing a predetermined characteristic from the reception signal and discriminating whether the modulation type of the reception signal is an analog modulation type or a digital modulation type. The analog/digital modulation type discrimination portion includes a discrimination portion for, in case where the modulation type of the reception signal is discriminated to be the digital modulation type, discriminating whether the reception signal is a linear modulation type or a non-linear modulation type among the digital modulation type.

By paying attention to the fact that the reception signal has a characteristic corresponding to a communication modulation type in compliance with it, the automatic modulation type discrimination apparatus according to the present invention is adapted such that the modulation types is discriminated by extracting/analyzing this characteristic.

In concretely mentioning, the automatic modulation type discrimination apparatus comprises an analog/digital modulation type discrimination circuit for discriminating whether the reception signal is the analog modulation type, the linear modulation type by digital modulation type or the non-linear modulation type by digital modulation type (1 in FIG. 5).

The automatic modulation type discrimination apparatus further includes an analog modulation type discrimination circuit for, in case where the reception signal is discriminated to be the analog modulation type, receiving that reception signal and discriminating whether the reception signal is an AM signal or an FM signal among the analog modulation type (2 in FIG. 2).

The automatic modulation type discrimination apparatus further includes a linear modulation type discrimination circuit for, in case where the reception signal is discriminated to be the linear modulation type by the digital modulation type, receiving that reception signal and discriminating whether the reception signal is a BPSK signal, a QPSK signal, a $\pi/4$-shift QPSK signal, an 8-PSK signal, an M-ary PSK signal of multi-level exceeding 8-levels, a 16 QAM signal or an M-ary QAM signal of multi-level exceeding 16-levels among the linear modulation type by the digital modulation type (3 in FIG. 5).

The automatic modulation type discrimination apparatus further includes also a non-linear modulation type discrimination circuit for, in case where the reception signal is discriminated to be the non-linear modulation type by the digital modulation type, receiving that reception signal and discriminating whether the reception signal is an M-ary FSK signal of multi-level exceeding 2-levels, a 2-FSK signal, an MSK signal or a GMSK signal among the non-linear modulation type by digital modulation type (4 in FIG. 5).

According to another aspect of the present invention, an automatic modulation type discrimination system having the automatic modulation type discrimination apparatus mentioned above is provided. The automatic modulation type discrimination apparatus is realized by a DSP (Digital Signal Processor)/CPU (Central Processing Unit) operated in compliance with a previously stored program. The automatic modulation type discrimination system includes an ADC (Analog Digital Converter) for quantizing an analog reception signal of intermediate frequency to a digital signal, and an HBF (Half Band Filter) for performing an orthogonal transformation processing for transforming the quantized signal of intermediate frequency to a complex signal of a base band zone, an LPF (Low Pass Filter) processing and a thinning processing of 2 (two). The automatic modulation type discrimination system further includes an NCO type oscillator module for compensation an error of synchronous frequency, a buffer for temporarily storing the reception data and smoothly giving the reception data to the DSP/CPU, a clock signal generator, and a PLD (Programmable Logic Device) for internally frequency-dividing a clock signal from the clock signal generator and supplying it to each element.

According to further aspect of the present invention, there is provided an automatic modulation type discrimination method for receiving a reception signal having unknown communication elements and discriminating a modulation type of the reception signal, characterized in that a predetermined characteristic is extracted from the reception signal and analyzed and thereby it is discriminated whether the modulation type of the reception signal is an analog modulation type or a digital modulation type.

According to a still further aspect of the present invention, an automatic modulation type discrimination method for receiving a reception signal having unknown communication elements and discriminating a modulation type of the reception signal is provided. The automatic modulation type discrimination method includes a first step for performing, for the reception signal, a predetermined characteristic extraction and analysis processing. In a second step, on the basis of the extracted characteristic and analysis result, it is determined whether the reception signal is the analog modulation type, the linear modulation type by digital modulation type, or the non-linear modulation type by digital modulation type. In a third step, in case where in the second step the reception signal is determined to be one by the analog modulation type, a preselected characteristic extraction and analysis processing is performed for the reception signal. In a fourth step, on the basis of the characteristic and analysis result extracted in the third step, it is determined whether the reception signal is the AM signal or the FM signal. In a fifth step, in case where in the fourth step the reception signal is determined to be neither the AM signal nor the FM signal, that is, unknown signal, a backtracking processing is performed. In a sixth step, in case where in the second step the reception signal is determined to be the linear modulation type by the digital modulation type, a re-sampling processing including an extraction of a symbol clock and an extension of a signal symbol is performed for the reception signal. In a seventh step, a symbol vector radius is computed on the basis of a re-sampling processing result and, further, a characteristic of its amplitude distribution is extracted. In an eighth step, on the basis of the extracted characteristic of the amplitude distribution, it is determined whether the reception signal is a 16 QAM signal and an M-ary QAM signal of multi-level exceeding 16-levels or a signal other than the former signals. In a ninth step, in case where in the eighth step the reception signal is determined to be a linear modulating signal other than the 16 QAM signal and the M-ary QAM signal, a modulation type is assumed and an assumed carrier wave synchronization processing is performed. In a tenth step, from a processing result obtained by the ninth step, amplitude distributions of a signal symbol of (odd number)-th and a signal symbol of (even number)-th are extracted. In an eleventh step, on the basis of the amplitude distributions extracted in the tenth step, it is determined whether the reception signal is a BPSK signal, a QPSK signal, a $\pi/4$-shift QPSK signal, an 8-PSK signal or an M-ary PKS signal of multi-level exceeding 8-levels. In a twelfth step, in case where in the eleventh step the reception signal is determined to be an unknown signal other than the BPSK signal, the QPSK signal, the $\pi/4$-shift QPSK signal, the 8-PSK signal and the M-ary PKS signal, a backtracking processing is performed. In a thirteenth step, in case where in the second step the reception signal is determined to be the non-linear modulation type by the digital modulation type, an FM detection, a symbol clock extraction and a re-sampling processing are performed. In a fourteenth step, from a signal re-sampled in the thirteenth step, an amplitude distribution extraction processing for a multi-level number determination in the non-linear modulation type is performed. In a fifteenth step, by performing the multi-level number determination on the basis of the amplitude distribution extracted in the fourteenth step, it is determined whether the reception signal is an M-ary FSK signal of multi-level exceeding 2-levels or a signal or other than the former signal. In a sixteenth step, in case where in the fifteenth step the reception signal is determined to be the signal other than the M-ary FSK signal, a modulation index of the receptor signal is detected on the basis of a symbol clock extracted in the thirteenth step. In a seventeenth step, on the basis of the modulation index detected in the sixteenth step, it is determined whether the reception signal is a 2-FSK signal or a signal other than the former signal. In an eighteenth step, in case where in the seventeenth step the reception signal is determined to be the signal other than the 2-FSK signal, an intersymbol interference in a time axis and an intersymbol interference in a frequency axis are analyzed. In a nineteenth step, by an analysis result in the eighteenth step, it is determined whether the reception signal is an MSK signal, a GMSK signal or an unknown signal. In a twentieth step. In case where in the nineteenth step the reception signal is determined to be the unknown signal, a backtracking processing is performed.

According to yet further aspect of the present invention, a recording medium in which a program for causing a computer to implement the aforesaid first to twentieth steps has been recorded is provided.

BRIEF DESCRIPTION OF THE DRAWINGS

FIG. 7 is a view showing an algorithm for an analog/digital modulation type discrimination in the automatic modulation type discrimination apparatus shown in FIG. 5;

FIG. 9 is a view showing an algorithm for an analog modulation type discrimination of the automatic modulation type discrimination apparatus shown in FIG. 5;

DESCRIPTION OF THE PREFERRED EMBODIMENTS

Figure 5:
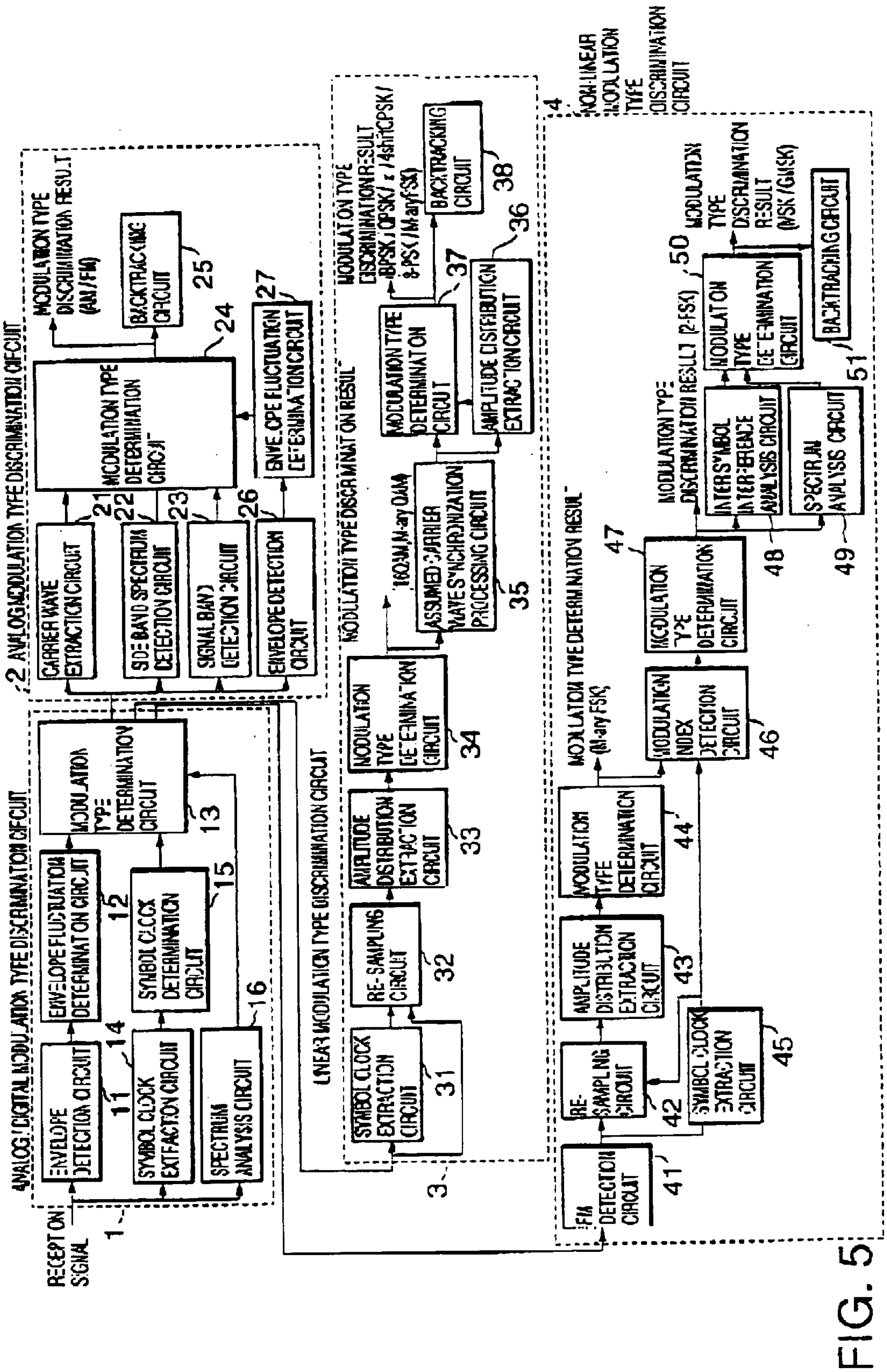
FIG. 5 is a block diagram showing a constitution of an automatic modulation type discrimination apparatus according to a first embodiment of the present invention.

An automatic modulation type discrimination apparatus according to a first embodiment of the present invention is explained by referring to FIG. 5. The automatic modulation type discrimination apparatus comprises an analog/digital modulation type discrimination circuit 1, an analog modulation type discrimination circuit 2, linear modulation type discrimination circuit 3, and a non-linear modulation type discrimination circuit 4.

The analog/digital modulation type discrimination circuit 1 is a circuit for, when a reception signal having unknown communication elements is inputted, discriminating whether the reception signal is an analog modulation type or a digital modulation type. The reception signal having been discriminated to be the analog modulation type as a result of the discrimination in the analog/digital modulation type discrimination circuit 1 is inputted to the analog modulation type discrimination circuit 2. The analog modulation type discrimination circuit 2 is a circuit for discriminating whether the inputted signal is an AM (Amplitude Modulation) signal or an FM (Frequency Modulation) signal.

The reception signal having been discriminated to be the linear modulation type of digital modulation type in the analog/digital modulation type discrimination circuit 1 is inputted to the linear modulation type discrimination circuit 3. The linear modulation type discrimination circuit 3 is a circuit for discriminating whether the inputted reception signal is a BPSK (Binary Phase Shift Keying) signal, a QPSK (Quadrature Phase Shift Keying) signal, a $\pi$/4-shift QPSK signal, an 8-PSK signal, an M-ary PKS (M-ary Phase Shift Keying) signal of multi-level exceeding 8-levels (where, M is a positive integer), a 16 QAM (Quadrature Amplitude Modulation) signal or an M-ary QAM (M-ary Quadrature Amplitude Modulation) signal of multi-level exceeding 16-levels.

On the other hand, the reception signal having been discriminated to be the non-linear modulation type of digital modulation type in the analog/digital modulation type discrimination circuit 1 is inputted to the non-linear modulation type discrimination circuit 4. The non-linear modulation type discrimination circuit 4 is a circuit for discriminating whether the inputted reception signal is an M-ary FSK (M-ary Frequency Shift Keying) signal of multi-level exceeding 2-levels, a 2-FSK (Frequency Shift Keying) signal, an MSK (Minimum Shift Keying) signal or a GMSK (Gaussian Filtered Minimum Shift Keying) signal.

The analog/digital modulation type discrimination circuit 1 includes an envelope direction circuit (first envelope detection portion) 11 and an envelope fluctuation determination circuit (first envelope fluctuation determination portion) 12. The envelope detection circuit 11 is a circuit for extracting an envelope from the reception signal. The envelope fluctuation determination circuit 12 is a circuit for, after integrating the extracted envelope for a specified time, computing an average value thereof and extracting an envelope fluctuation characteristic.

The analog/digital modulation type discrimination circuit 1 further includes a symbol clock extraction circuit (first symbol clock extraction portion) 14, a symbol clock determination circuit 15, and a spectrum analysis is circuit (first spectrum analysis portion) 16. The symbol clock extraction circuit 14 extracts a symbol clock from the reception signal. The symbol clock determination circuit 15 determines an existence/nonexistence of the symbol clock from an output of the symbol clock extraction circuit 14. The spectrum analysis circuit 16 extracts a spectrum of the reception signal and analyzes a characteristic thereof (for example, a spectrum shape.

The analog/digital modulation type discrimination circuit 1 further has a modulation type determination circuit (first modulation type determination portion) 13. By means of a characteristic extraction result of the reception signal by the envelope fluctuation determination circuit 12 and the symbol clock determination circuit 15 and of an analysis result of the reception signal by the spectrum analysis circuit 16, the modulation type determination circuit 13 discriminates whether the reception signal is the analog modulation type, the linear modulation type of digital modulation type or the non-linear modulation type of digital modulation type, and sorts them.

Incidentally, the symbol clock extraction circuit 14 has a function of extracting the symbol clock of the linear modulation type by digital modulation type and a function of extracting the symbol clock of the non-linear modulation type by digital modulation type.

The reception signal discriminated to be the analog modulation type in the analog/digital modulation type discrimination circuit 1 is inputted to the analog modulation type discrimination circuit 2. The analog modulation type discrimination circuit 2 includes a carrier wave extraction circuit 21, a side band spectrum detection circuit 22, and a signal band detection circuit 23. The carrier wave extraction circuit 21 extracts a carrier wave of the inputted reception signal. The side band spectrum detection circuit 22 detects a symmetric property of a side band spectrum of a spectrum of the inputted reception signal. The signal band detection circuit 23 detects a signal band of the inputted reception signal and analyzes a spectrum shape of the reception signal.

The analog modulation type discrimination circuit 2 further includes an envelope detection circuit (second envelope detection portion) 26 for determining whether or not an envelope fluctuation of the inputted reception signal is a constant envelope, and an envelope fluctuation determination circuit (second envelope fluctuation determination portion) 27. The analog modulation type discrimination circuit 2 further includes a modulation type determination circuit (second modulation type determination portion) 24. From a characteristic extraction and an analysis result of the reception signal from the carrier wave extraction circuit 21, the side band spectrum detection circuit 22 and the signal band detection circuit 23, the modulation type determination circuit 24 discriminates whether the reception signal is an AM modulation type, an FM modulation type or an unknown (unclear) signal not capable of being as either the former ones.

The analog modulation type discrimination circuit 2 further has a backtracking circuit (first backtracking portion) 25. The backtracking circuit 25 is a circuit for storing a branch point (branch) of each determination control processing at each portion mentioned above and, in case where the unknown signal is inputted, switching the unknown signal such that a processing for discriminating the different modulation type is performed again by returning to that branch point.

Here, when the unknown signal is returned to the branch point of the determination processing, in case where there are plural candidates, the backtracking circuit 25 computes a candidate having a highest possibility from a result obtained by the modulation type discrimination processing until that point of time, and performs a switching of the processing circuit (branch) for the unknown signal.

The reception signal by the linear modulation type among the digital modulation type discriminated in the analog/digital modulation type discrimination circuit 1 is inputted to the linear modulation type discrimination circuit 3. The linear modulation type discrimination circuit 3 includes a symbol clock extraction circuit (second symbol clock extraction portion) 31, a re-sampling circuit (first re-sampling portion) 32, an amplitude distribution extraction circuit (first amplitude distribution extraction portion) 33, and a modulation type determination circuit (third modulation type determination portion) 34. The symbol clock extraction circuit 31 regenerates and extracts the symbol clock from the inputted reception signal. The re-sampling circuit 32 re-samples the reception signal on the basis of the extracted symbol clock, and extracts an information-super inposed single symbol. The amplitude distribution extraction circuit 33 computes a symbol vector radius, and extracts its amplitude distribution. The modulation type determination circuit 34 discriminates the 16 QAM signal and the M-ary QAM signal of multi-level exceeding 16-levels from the signal other than the former signals on the basis of the result being outputted from the amplitude distribution extraction circuit 33, and sorts a discrimination result.

The linear modulation type discrimination circuit 3 further includes an assumed carrier wave synchronization processing circuit 35, an amplitude distribution extraction circuit (second amplitude distribution extraction portion) 36, a modulation type determination circuit (fourth modulation type determination portion) 37, and a backtracking circuit (second backtracking portion) 38. A signal discriminated to be a signal other than the 16 QAM signal and the M-ary QAM signal is inputted to the assumed carrier wave synchronization processing circuit 35. The assumed carrier wave synchronization processing circuit 35 realizes a carrier wave synchronization processing by assuming the modulation type of the inputted signal. The amplitude distribution extraction circuit 36 extracts amplitude distributions of the signal symbol of (odd number)-th and the signal symbol of (even number)-th. From a convergence position of the signal symbol after the assumed carrier wave synchronization processing, a number of convergence points and an amplitude distribution for every one symbol, the modulation type determination circuit 37 discriminates whether the modulation type of the signal is the BPSK, the QPSK, the π/4shift QPSK, the 8-PSK, the M-ary PSK of multi-level exceeding 8-levels or an unknown signal not corresponding to the former ones. The backtracking circuit 38 stores a branch point (branch) of each determination processing at the modulation type determination circuit 37 and, in case where the unknown signal is inputted, switches the signal such that a processing for discriminating the different modulation type is performed again by returning to the branch point.

A signal discriminated to be the non-linear modulation type of digital modulation type is inputted to the non-linear modulation type discrimination circuit 4 from the analog/digital modulation type discrimination circuit 1. The non-linear modulation type discrimination circuit 4 includes an FM detection circuit 41, a symbol clock extraction circuit (third symbol clock extraction portion) 45, a re-sampling circuit (second re-sampling portion) 42, an amplitude distribution extraction circuit (fourth amplitude distribution extraction portion) 43, and a modulation type determination circuit (fifth modulation type determination portion) 44. The FM detection circuit 41 performs an FM detection processing for the inputted signal. The symbol clock extraction circuit 45 regenerates and extracts the symbol clock from an output of the FM detection circuit 41. The re-sampling circuit 42 performs a re-sampling processing of the inputted signal on the basis of the extracted symbol clock. The amplitude distribution extraction circuit 43 extracts an amplitude distribution for a multi-level number determination in the non-linear modulation type, from the re-sampled signal. The modulation type determination circuit 44 performs the multi-level number determination on the basis of the result being extracted from the amplitude distribution extract circuit 43, discriminates the M-ary FSK signal (where, $M \geqq 3$) from a signal other than the former signal, and sorts them.

The non-linear modulation type discrimination circuit 4 further includes a modulation index detection circuit 46 and a modulation type determination circuit (sixth modulation type determination portion) 47. For a signal discriminated to be a signal other than the M-ary FSK signal, the modulation index detection circuit 46 detects a modulation index of the inputted signal on the basis of the symbol clock extracted in the symbol clock extraction circuit 45. The modulation type determination circuit 47 discriminates between the 2-FSK signal and a signal other than the former signal from the detected modulation index, and sorts them.

The non-linear modulation type discrimination circuit 4 further has an intersymbol interference analysis circuit 48, a spectrum analysis circuit (second spectrum analysis portion ) 49, a modulation type determination circuit (seventh modulation type determination portion) 50, and a backtracking circuit (third backtracking portion) 51. The intersymbol interference analysis circuit 48 analyzes an intersymbol interference in time axis of a signal discriminated to be a signal of the modulation type other than the M-ary FSK. The spectrum analysis circuit 49 performs a spectrum analysis of the above signal, and analyzes the intersymbol interference in frequency axis. On the basis of a characteristic extraction and an analysis result from the intersymbol interference analysis circuit 48 and the spectrum analysis circuit 49, the modulation type determination circuit 50 discriminates the MSK signal and the GMSK signal from an unknown (unclear) signal not capable of being determined as either of the former signals, and sorts them. The backtracking circuit 51 stores a branch point (branch) of each determination processing at the modulation type determination circuit 50 and, in case where the unknown signal is inputted, switches the unknown signal such that a processing for discriminating the different modulation type is performed again by returning to that branch point.

Incidentally, as mentioned before, when the unknown signal is returned to the point of the determination processing, in case where there are plural candidates, the backtracking circuit 51 computes a candidate having a highest possibility from a result obtained by the modulation type discrimination processing until that point of time, and performs a switching of the processing circuit (branch) for the unknown signal.

Next, an operation of the discrimination apparatus according to this embodiment is detailed explained by referring to FIG. 5 to FIG. 7, FIGS. 8A to 8C. FIG. 10, FIGS. 11A, 11B, FIGS. 12A, 12B, FIGS. 13A, 13B, and FIGS. 14A, 14B. The reception signal is inputted to the envelope detecting circuit 11, and an envelope (amplitude level) Xj of the reception signal is computed in the envelope detection circuit 11. Supposing that an in-phase channel is I and an orthogonal channel Q, that is expressed like an equation (1) recited below:

$$Xj=(I^2+Q^2)^{1/2} \qquad (1)$$

where j is a variable of time, and Xj denotes the envelope of the reception signal in a certain time j.

The envelope fluctuation determination circuit 12 observes the envelope Xj for a specified time and finds an average value $\mu$ and a standard deviation $\sigma$ of the envelope.

These are expressed like equations (2) and (3) recited below.

$$\mu - \frac{1}{N}\sum_{j=1}^{N} Xj \tag{2}$$

$$\sigma = \sqrt{\frac{1}{(N-1)}\sum_{j=1}^{N}(Xj-\mu)^2} \tag{3}$$

An envelope fluctuation characteristic of the reception signal can be extracted by $\sigma/\mu$ which is a ratio between the average value $\mu$ and the standard deviation $\sigma$. In case where the reception signal is a signal of the linear modulation type system, the $\sigma/\mu$ is not equal to 0, and it follows that there is an envelope fluctuation. On the other hand in case where the reception signal is a signal of the non-linear modulation type system, the $\sigma/\mu$ becomes approximately equal to 0, and it follows that there is no envelope fluctuation.

Figure 6:
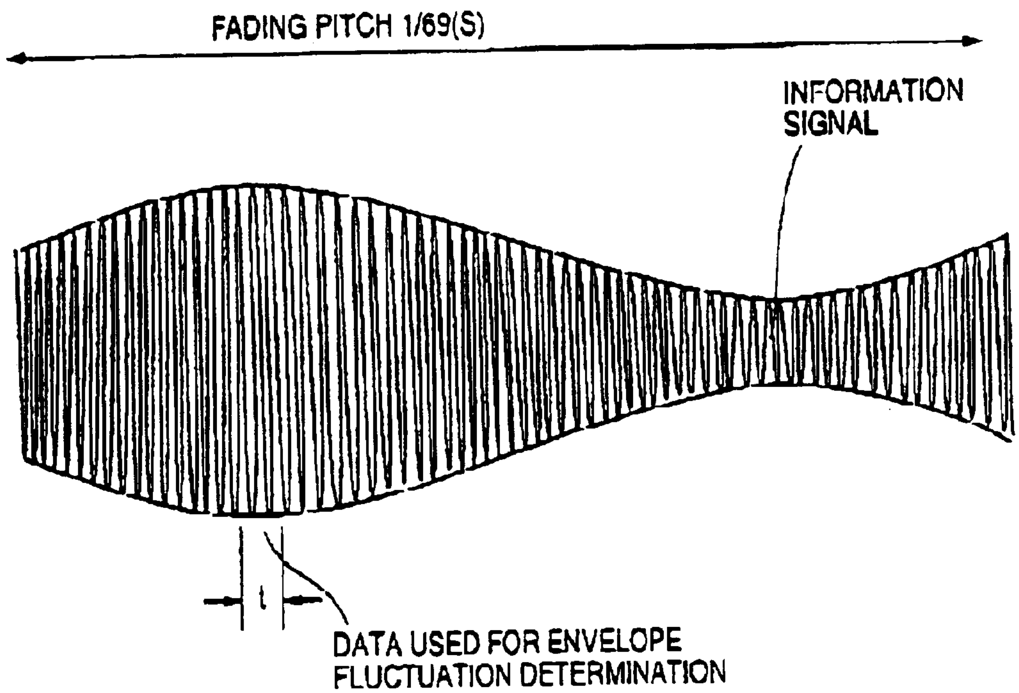
FIG. 6 is a waveform view for explaining a setting in which an influence on a fading characteristic of the automatic modulation type discrimination apparatus shown in FIG. 5 is token into consideration.

Here, at a radio wave propagation time, there is possibility that the reception signal is subjected to an influence of fading. In the present invention, this influence is also studied and dealt with. Concretely, it is supposed that a communication device is moving, and assumed that a carrier wave frequency is 1.5 GHz and a moving speed of the communication device 50 km/h. In this case, a fading pitch of a reception device becomes 69 Hz, and a fluctuation in reception intensity, i.e., fluctuation in envelope, of about 70 times per 1 second occurs. However, if a PHS (Personal Handy Phone System) is taken as an example, its modulation type is a π/4-shift DQPSK by linear modulation type (envelope fluctuation exists), a modulation speed is 192 ksymbol/s, and an envelope fluctuation is repeated at a speed of about 300 times the fading pitch. As shown in FIG. 6, in the present invention, by shortening a time t of data used in the modulation type discrimination, the influence by the fading is reduced. This time t is a value of a degree capable of being neglected in comparison with the fading pitch. Further, also in case of the non-linear modulation type (constant envelope modulation type), similarly the influence of the fading can be reduced. That is, by using the data of short time, an influence when determining an existence/nonexistence of the envelope fluctuation is deleted.

In the symbol clock extraction circuit 14, a symbol clock extraction processing with respect to both modulation types of the linear modulation type (BPSK, QPSK, π/4-shift QPSK ,8-PSK, M-ary PSK, 16 QAM, M-ary QAM) and the non-linear modulation type (M-ary FSK, 2-FSK, MSK, GMSK) of digital modulation type are performed for the reception signal. A symbol clock extraction result is inputted to the symbol clock determination circuit 15. On the basis of the symbol clock extraction result, the symbol clock determination circuit 15 determines an existence/nonexistence of the symbol clock.

Here, in case of the digital modulation type, the symbol clock necessarily exists, and a value (constant value) complying with the symbol speed is obtained by the symbol clock extraction processing. On the other hand, in case of the analog modulation type, the symbol clock does not exist, and an output of the symbol clock extraction circuit 14 greatly fluctuates in its value with an elapse of time. This is because a signal outputted as the symbol clock is influenced by an analog signal itself such as voice, which is a source signal. From a distribution characteristic of the symbol clock, the symbol clock determination circuit 15 determines an existence/nonexistence of the symbol clock.

In the spectrum analysis circuit 16, a spectrum shape of a modulating signal before being demodulated is analyzed. The spectrum shape has an inherent characteristic for every modulation type, so that an analysis of the modulation type determination is possible from the spectrum shape. In the modulation type determination circuit 13, on the basis of plural characteristics extraction result of the envelope fluctuation extraction circuit 12, the symbol clock determination circuit 15 and the spectrum analysis circuit 16, the analog modulation type is discriminated from the linear modulation type and the non-linear modulation type by digital modulation type. The modulation type determination circuit 13 respectively outputs a signal of the analog modulation type to the analog modulation type discrimination circuit 2, a signal of the linear modulation type by digital modulation type to the linear modulation type discrimination circuit 3, and a signal of the non-linear modulation type by digital modulation type to the non-linear modulation type discrimination circuit 4.

Concretely, the modulation type determination circuit 13 performs the discrimination by collating the extracted characteristic of the reception signal with characteristics possessed by the modulating signal as shown in FIG. 7. First, the discrimination between the analog modulation type and the digital modulation type (including the linear modulation type and the non-linear modulation type) is possible by an existence/nonexistence of the symbol clock. That is, it is discriminated as the analog type in case where no symbol clock exists, and as the digital modulation type in case where the symbol clock exists. As mentioned before, this is because in the digital modulation type the modulation of information signal is performed tuning with a specified symbol clock timing.

Secondly, by observing the envelope fluctuation of the reception signal, it is possible to discriminate the linear modulation type from the non-linear modulation type. The linear modulation type has a characteristic that its envelope fluctuates, and AM, BPSK, QPSK, π/4-shift QPSK, M-ary PSK, 16 QAM, M-ary QAM correspond to this. On the other hand, the non-linear modulation type has a characteristic that its envelope is constant, and M-ary FSK, 2-FSK, MSK, GMSK correspond to this. Accordingly, by analyzing the envelope fluctuation, the discrimination between the linear modulation type and the non-linear modulation type is possible.

Figure 8C:
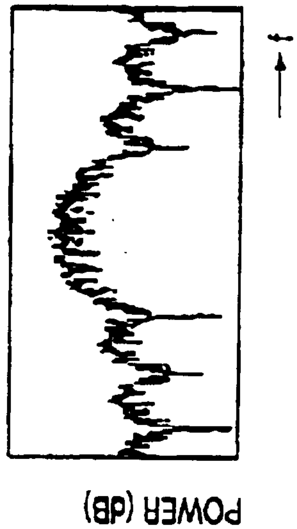
FIGS. 8A to 8C are views for explaining algorithms for the analog/digital modulation type discrimination by spectrum shapes of the automatic modulation type discrimination apparatus shown in FIG. 5.
Figure 8B:
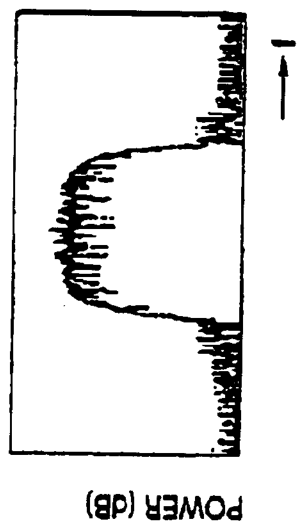
Figure 8A:
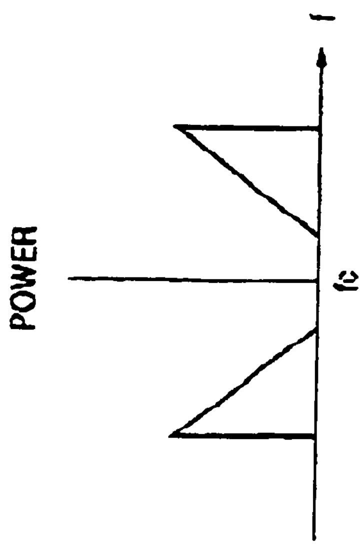

Thirdly, by the spectrum shape of the reception signal, the discrimination between the AM modulation type, the linear modulation type and the non-linear modulation type is possible. For example, as shown in FIG. 8A, the AM modulation type has a characteristic that it has a carrier wave spectrum and two side band spectrums symmetrical with respect to the carrier wave spectrum. On the other hand, as shown in FIG. 8B, the linear modulation type has a characteristic that a signal band has a limited band limitation type spectrum and the spectrum sharply attenuates. While, as shown in FIG. 8C, the non-linear modulation type has, different from the characteristic of the linear modulation type, a characteristic that the spectrum slowly attenuates accompanying with a detuning of frequency.

On the basis of such characteristics as mentioned above, the modulation type determination circuit 13 discontinues whether the reception signal is the analog modulation type, the linear modulation type of digital modulation type or the non-linear modulation type of digital modulation type, and outputs the reception signal to a next stage corresponding to a discrimination result. As mentioned above, the modulation type determination circuit 13 has, as one of its characteristics, a characteristic that the determination of the modulation type is performed at high accuracy by using the extraction result of plural characteristics obtained from the reception signal. Further, the modulation type determination circuit 13 is adapted such that a test using a test signal is previously performed for the extraction result of plural characteristics and, from a result of this test, the discrimination of the modulation type is performed by adding a weight coefficient for improving a discrimination accuracy of the modulation type to the extraction result of plural characteristics.

Next, the reception signal discrimination by the modulation type determination circuit 13 is inputted to any one of the analog modulation type discrimination circuit 2, the linear modulation type discrimination circuit 3 and the non-linear modulation type discrimination circuit 4.

In case where the reception signal is discriminated to be the analog modulation type, the reception signal is inputted to the analog modulation type discrimination circuit 2, and the discrimination between an AM signal and an FM signal is performed. A discrimination processing is performed by extracting characteristics, shown in FIG. 9, possessed by the AM signal and the FM signal. Concretely, in case where a short time spectrum waveform of the AM signal is compared with that of the FM signal, the AM signal has a carrier wave component, and further has symmetrical two side band spectrums. On the other hand, the FM signal has an asymmetrical spectrum. Further, generally a signal band width is narrower in the AM signal than in the I-M signal. This is because a band width of information signal directly becomes the signal band width since the AM signal is the modulation type in which the modulation is directly performed by the information signal. That is, the AM signal is different from the FM signal in which the frequency modulation is performed with the information signal being made an input signal of VCO (Voltage Control Oscillator).

For reference, although an equation for computing a spectrum waveform of the FM signal is expressed as an equation (4) recited below, generally the FM signal has an infinite frequency by a first kind Dessel function of n order:

$$f_{FM}(t)=Vc\ J_0(m_f)\sin\ \omega_c l - Vc\ J_1(m_f)\cos(\omega_c \pm \omega_m)t - Vc\ J_2(m_f)\cos(\omega_c \pm 2\omega_m)t \quad (4)$$

where Jn (mf) is the first kind Bessel function of n order, mf a modulation index, ωm an angular frequency of information signal, and ωC a carrier wave frequency.

Besides, as to an envelope fluctuation characteristic, the envelope fluctuates depending on the information signal in the AM signal, while it is a constant envelope having no envelope fluctuation in the FM signal.

In order to extract these characteristics, first, an existence/nonexistence of the carrier wave component of an input signal is detected by the carrier wave extraction circuit 21. Secondly, as to the input signal, a symmetric property in positive/negative both directions with the carrier wave frequency being made a center is detected by the side band spectrum detection circuit 22. Thirdly, by the signal band detection circuit 23, a signal band width of the input signal is detected, and further a diffusion degree of the signal spectrum is detected. Here, as shown in FIG. 9, in the AM signal the spectrum is concentrated to a vicinity of the carrier wave, while the FM signal a diffusion spectrum having an occupied band of wide band is obtained. From such a viewpoint, the signal band detection circuit 23 determines whether or not the signal spectrum is the diffusion spectrum. Fourthly, the envelope detection circuit 26 and the envelope fluctuation determination circuit 27 are the same as the envelope detection circuit 11 and the envelope fluctuation determination circuit 12 in the analog/digital modulation type discrimination circuit 1 and, after detecting an envelope of the input signal, detect an existence/nonexistence of the envelope fluctuation by finding a fluctuation of that envelope.

The modulation type determination circuit 24 compares plural characteristics extraction result obtained from the input signal with an algorithm shown in FIG. 9, and discriminates whether the input signal is the AM signal, the I-M signal or an unknown (unclear) signal not capable of being discriminated either of the former signals. Here, similarly to the modulation type determination circuit 13 in the analog/digital modulation type discrimination circuit 1, the modulation type determination circuit 24 improves a discrimination accuracy by using plural determination parameters, and is adapted such that a further improvement in the discrimination accuracy is intended by performing a weighting processing for the plural characteristics extraction result inputted to the modulation type determination circuit 24. Incidentally, a weighting coefficient is found from a result previously adjusted so as to optimally operate in the test using the test signal. As to the reception signal discriminated as the AM modulation type or the FM modulation type, a discrimination result thereof is outputted.

On the other hand, the signal discriminated as unknown is inputted to the backtracking circuit 25, the backtracking circuit 25 has stored the aforesaid branch point (branch) of each determination processing and, in case where the unknown signal is inputted, switches the signal such that a processing for a different modulation type discrimination is performed again by returning to that branch point. Here, when the unknown signal is returned to the point of the determination processing by the backtracking circuit 25, in case where there are plurality candidates, a candidate having a highest possibility is computed from a result obtained by the modulation type discrimination processing until that point of time, and the unknown signal is switched. Concretely, for the reception signal which cannot be discriminated in the analog modulation discrimination processing the reception signal is switched to the linear modulation type discrimination circuit 3 or the non-linear modulation type discrimination circuit 4, or the analog/digital modulation discrimination processing is performed against in the analog/digital modulation type discrimination circuit 1.

The reception signal discriminated as the linear modulation type of digital modulation type in the analog/digital modulation type discrimination circuit 1 is inputted to the linear modulation type discrimination circuit 3. Here, first a symbol clock of the reception signal is extracted in the symbol clock extraction circuit 31. On the basis of the symbol clock extracted in the symbol clock extraction circuit 31, the re-sampling circuit 32 performs a re-sampling processing of the reception signal and extracts a signal (information) symbol. The symbol signal generates a symbol rotation of the signal because a carrier synchronous processing is not performed, but the extracted signal has such a convergence characteristic inherent to the modulation type as shown in FIGS. 10A to 10E.

Figure 1:
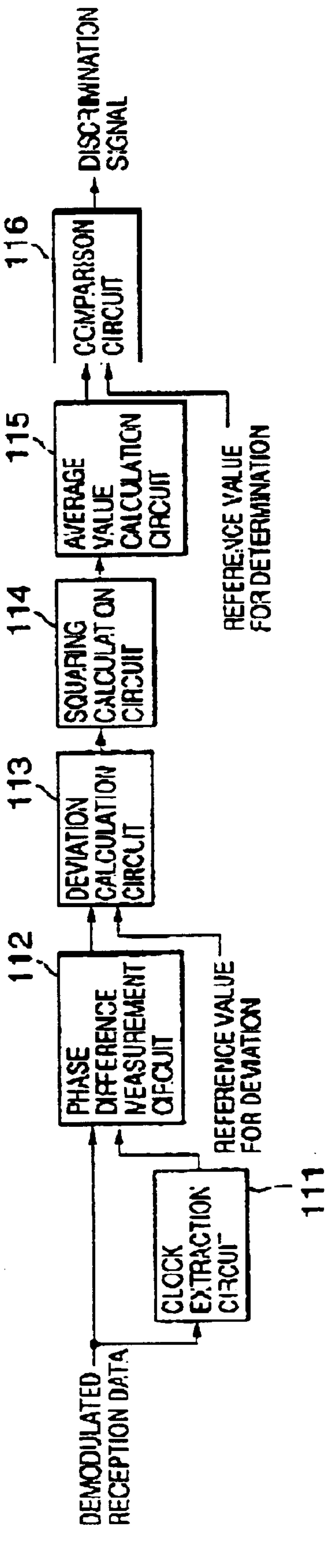
FIG. 1 is a block diagram showing one example of a conventional reception signal modulation type discrimination circuit.
Figures 2A, 2B, 2C:
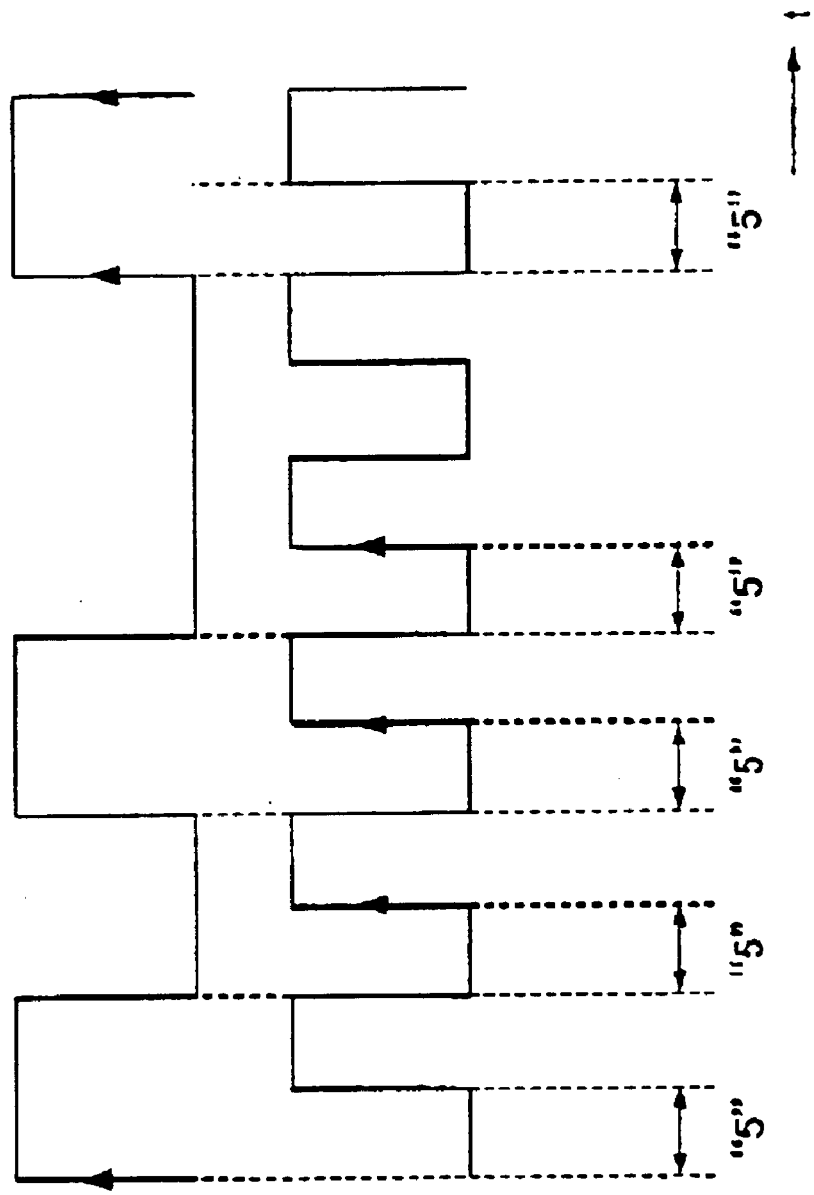
FIGS. 2A to 2C are waveform views for explaining an operation of the reception signal modulation type discrimination circuit of FIG. 1, in which a case of a reception signal of a desired modulation type is received.
Figures 3A, 3B, 3C:
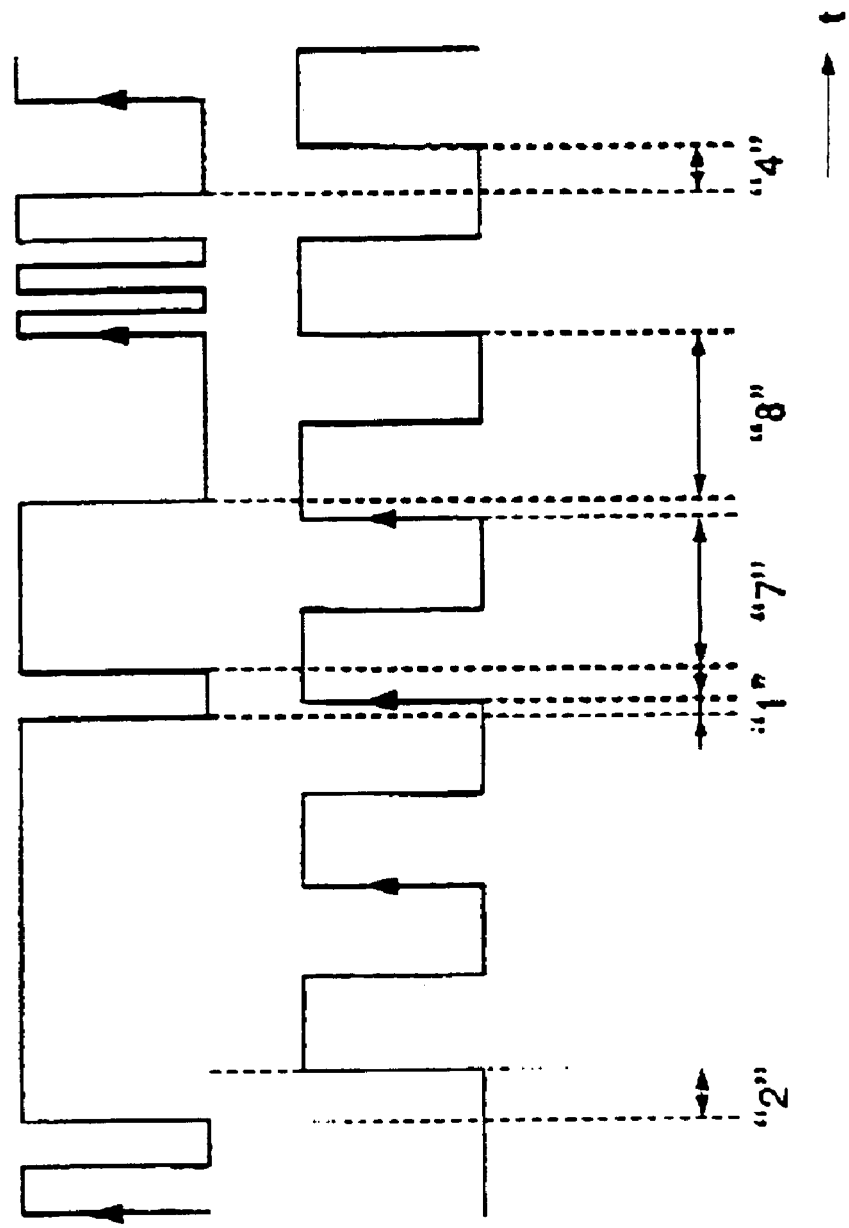
FIGS. 3A to 3C are waveform views for explaining the operation of the reception signal modulation type discrimination circuit of FIG. 1, in which a case of the reception signal different from the desired modulation type is received.
Figure 4:
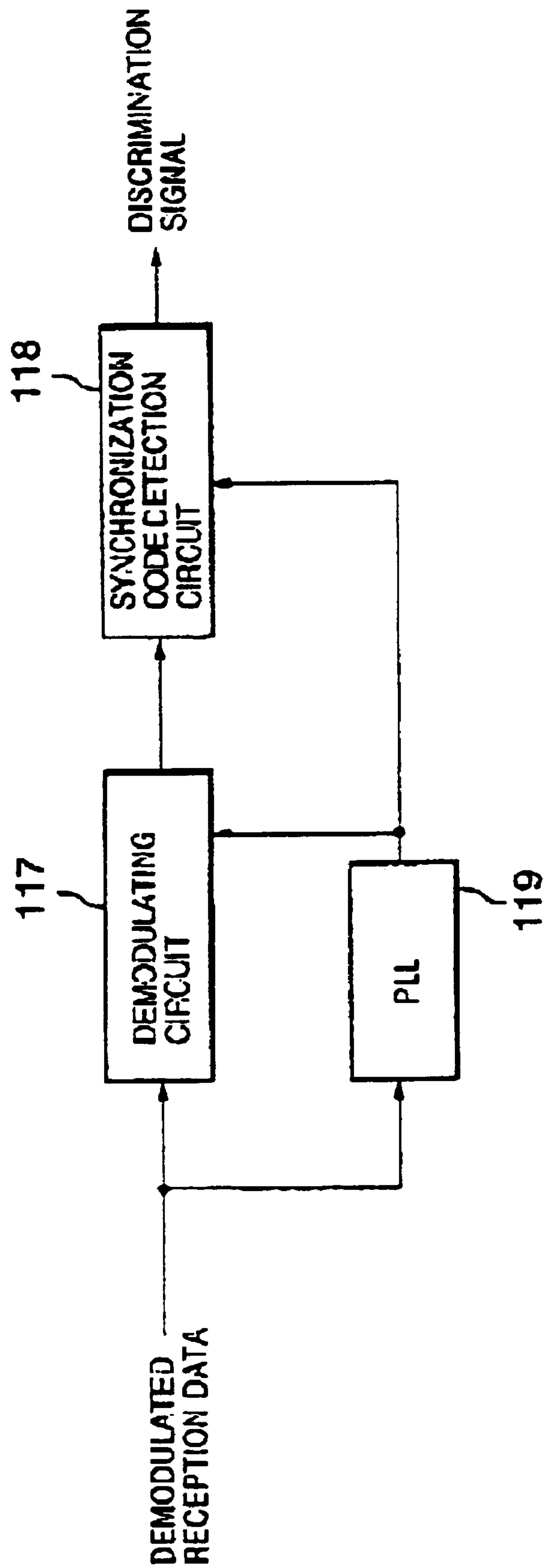
FIG. 4 is a block diagram showing a constitution of another example of the conventional reception signal modulation type discrimination circuit.
Figure 11A:
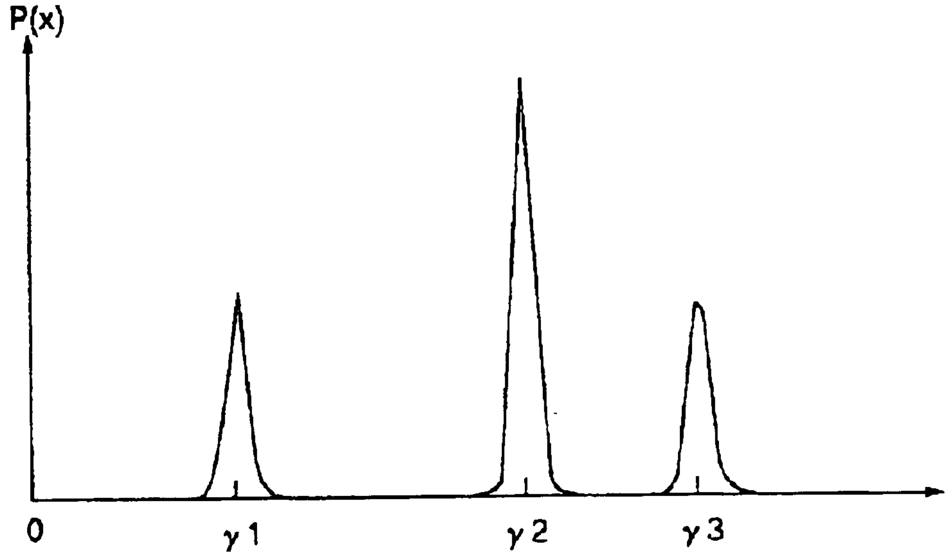
FIGS. 11A and 11B are views showing probability distributions of signal generation with respect to symbol vector radiuses of a 16 QAM signal and a 64 QAM signal among the reception signals inputted to the automatic modulation type discrimination apparatus shown in FIG. 5.

That is, as shown in FIG. 10A to FIG. 10D, as to each of the BPSK signal, the QPSK signal, the π/4-shift QPSK signal and the 8-PSK signal, the signal symbol is converged on a single circumference. Here, although the M-ary PSK signal shows the PSK signal of multi-level exceeding 8-levels, the fact that its symbol is converged on the single circumference is the same. Contrary to this, as shown in FIG. 10E, as to the 16 QAM signal, the signal symbol is converged on different three circumferences. Further, a symbol vector radius amplitude distribution probability P(x)

of the 16 QAM signal becomes, as shown in FIG. 11A, 1:2:1 if symbol vector radiuses are assumed to be γ1, γ2 and γ3 in the order from shorter one. Accordingly, by means of measuring the symbol vector radius from a signal origin while using an output of the re-sampling circuit 32 by the amplitude distribution extraction circuit 33, and further analyzing a number of the symbol vector radiuses and its amplitude distribution probability in the modulation type determination circuit 34, the 16 QAM signal can be discriminated from a signal other than it. Here for the M-ary QAM signal exceeding 16-levels, if M=64 is considered as an example, the symbol vector radius amplitude distribution probability P(x) of a re-sampling wave becomes FIG. 11B.

Figure 11B:
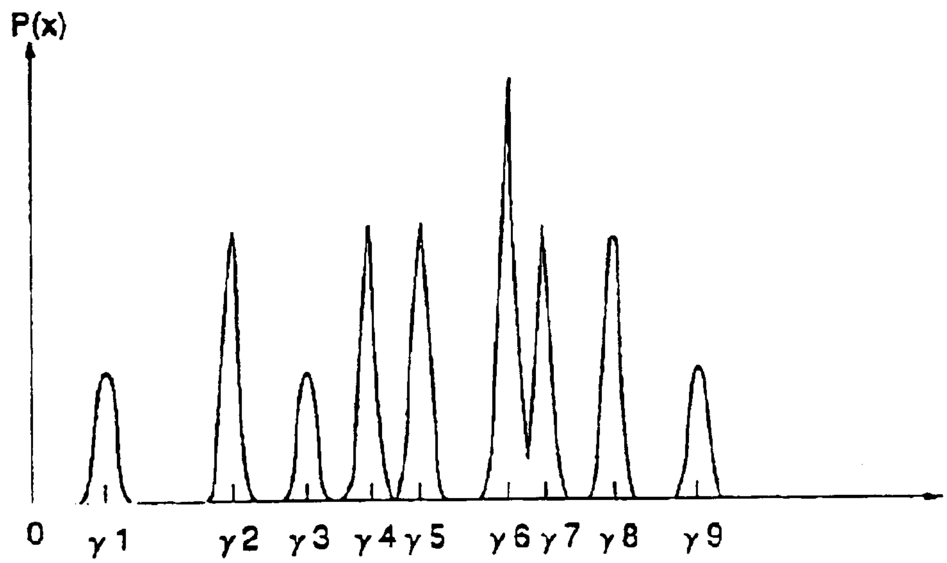

Here, as apparent also from FIG. 11A and FIG. 11B, as to the QAM signal, owing to its multi-level number, the number and the amplitude ratio of the symbol vector radiuses and the amplitude distribution probability are different. Concretely, as mentioned before, as to the 16 QAM signal, the number of the symbol vector radiuses is 3. Further, if the symbol vector radiuses are assumed to be γ1, γ2 and γ3 in the order from shorter one, ratios between these radiuses become $\gamma2:\gamma2:\gamma3=\sqrt{2}\cdot\sqrt{10}:3\sqrt{2}$. Further, the amplitude distribution probability becomes $P1(x):P2(x)=1:2:1$ in the order from smaller one. On the other hand, as to the 64 QAM signal, ratios between the radiuses become $\gamma1: \gamma5: \gamma3: \gamma4: \gamma5: \gamma6: \gamma7: \gamma8: \gamma9=\sqrt{2}: \sqrt{10}:3\sqrt{2}:\sqrt{26}:\sqrt{34}:5\sqrt{2}:\sqrt{58}:\sqrt{74}:7\sqrt{2}$, and the amplitude distribution probability becomes $P1(x): P2(x):P3(x):P4(x):P5(x):P6(x):P7(x):P8(x):P9(x)= 1:2:1:2:2:3:2:1$ in the order from smaller one. That is, as to the QAM signal, the characteristic is different owing to the multi-level number, so that its discrimination is possible.

As to the reception signal discriminated as the 16 QAM signal and the M-ary QAM signal in the modulation type determination circuit 34, its discrimination result is outputted. On the other hand, the signal discriminated as the modulation type other than the 16 QAM signal and the M-ary QAM signal is inputted to the assumed carrier wave synchronization processing circuit 35. As mentioned before, since the carrier wave synchronization processing is not performed to the inputted reception signal, a rotation is added to the signal symbol. Here, as shown in FIG. 10A to FIG. 10E, in the linear modulation type, the convergence position and the number of the convergence points of the signal symbol after the carrier wave synchronization processing are different in compliance with the modulation type. Accordingly, if the signal rotation of the reception signal can be stopped by the carrier wave synchronization processing the discrimination processing of the remained modulation type (BPSK, OPSK, π/4-shift QSPK, 8-PKS, M-ary PSK), other than the 16 QAM and the M-ary QAM becomes possible. It is the assumed carrier wave synchronization processing circuit 35 that performs such carrier wave synchronization processing. Concretely, the assumed carrier wave synchronization processing circuit 35 performs the carrier wave synchronization processing for the reception signal whose modulation type is unclear by assuming that the reception signal is a specified modulation type.

Here, the carrier wave synchronization processing in this embodiment is characterized by the fact that, by assuming a signal whose multi-level number is highest, a carrier synchronization can be established also for another modulation type. As an example, in case where the maximum multi-level number is made 8, it is assumed that the 8-PSK signal is received for the reception signal whose modulation type is unclear, and the carrier wave synchronization is established by performing the carrier wave synchronization processing.

A principle thereof is detailedly explained by referring to FIG. 10A to FIG. 10E.

Figure 10A:
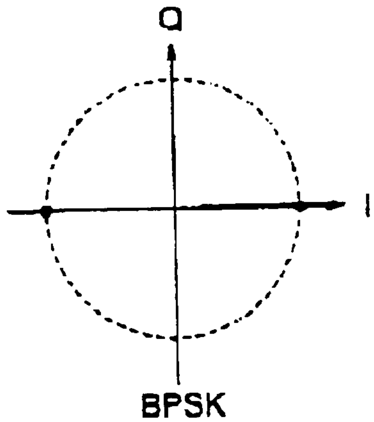
FIGS. 10A to 10E are views showing signal symbols of a linear modulation type among the reception signals inputted to the automatic modulation type discrimination apparatus shown in FIG. 5.
Figure 10B:
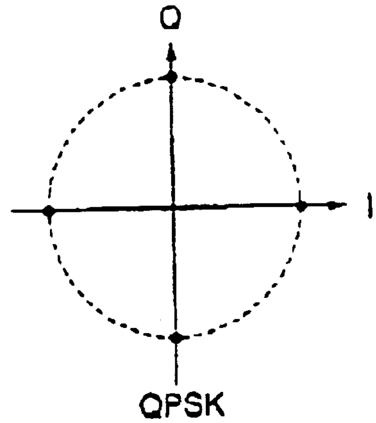
Figure 10C:
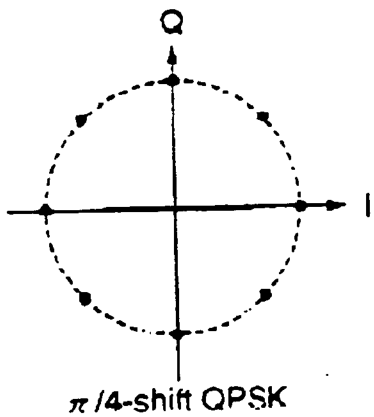
Figure 10D:
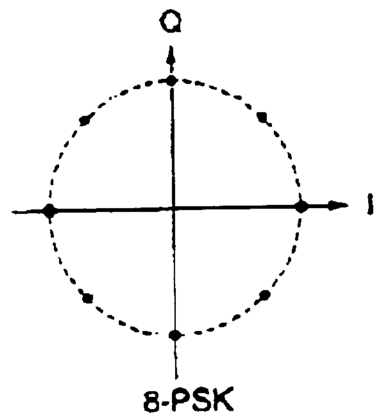
Figure 10E:
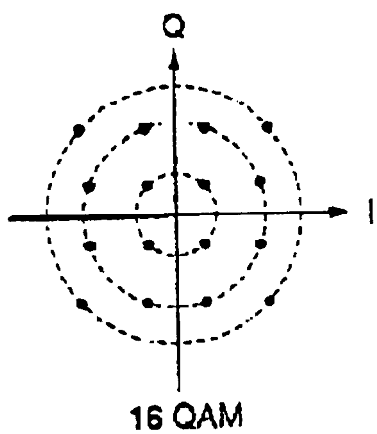

As apparent from FIG. 10D, the convergence points of the 8-PSK signal include the convergence points of another modulation type (BPSK, QPSK, π/4-shift QSPK). This means the fact that BPSK, QPSK, π/4-shift QSPK are a part of the 8-PSK. In this embodiment, by paying attention to this characteristic, the carrier wave synchronization processing is made possible. That is, the synchronization processing is possible by the M-ary PSK signal of multi-level including the symbol convergence points of another modulation type.

Figure 12A:
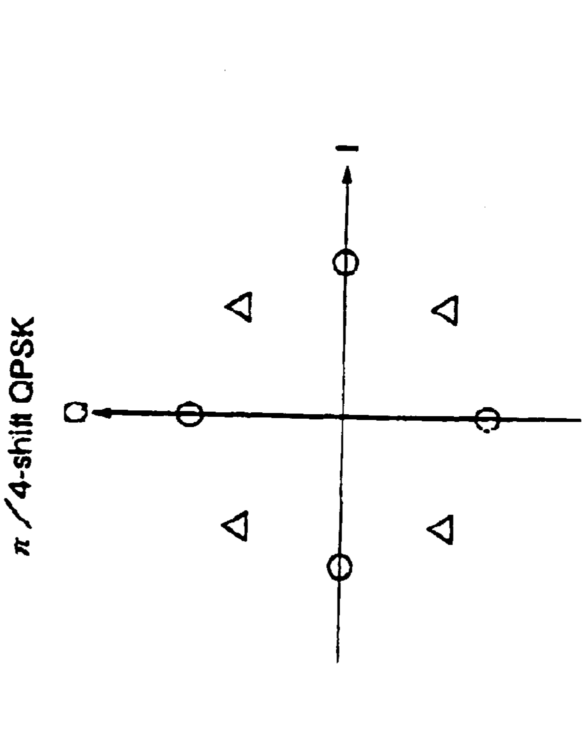
FIGS. 12A and 12B are views showing symbol convergence position characteristics for every one symbol time of a π/4-shift QPSK signal and an 8-PSK signal among the reception signals inputted to the automatic modulation type discrimination apparatus shown in FIG. 5.
Figure 12B:
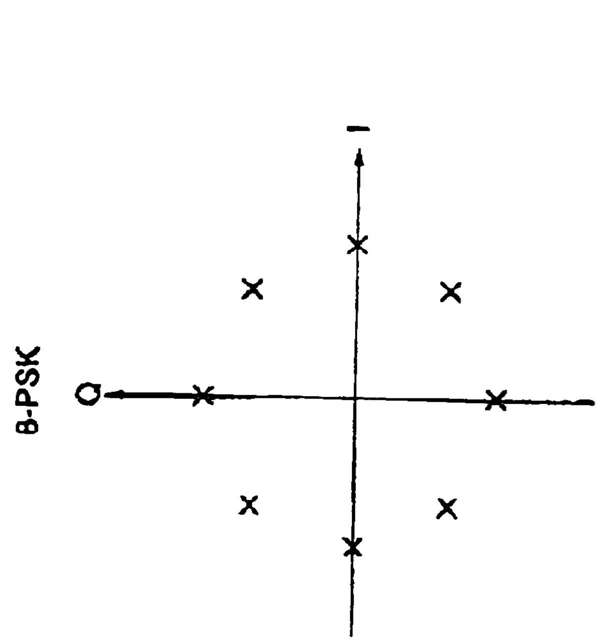
Figure 13A:
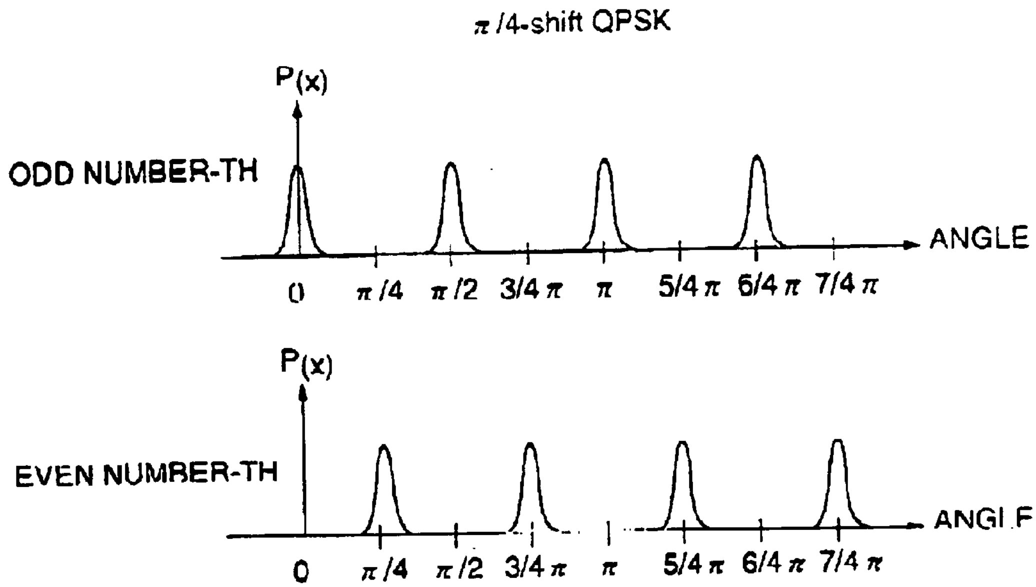
FIGS. 13A and 13B are views showing amplitude distributions for every one symbol time of the π/4-shift QPSK signal and the 8-PSK signal among the reception signals inputted to the automatic modulation type discrimination apparatus shown in FIG. 5.
Figure 13B:
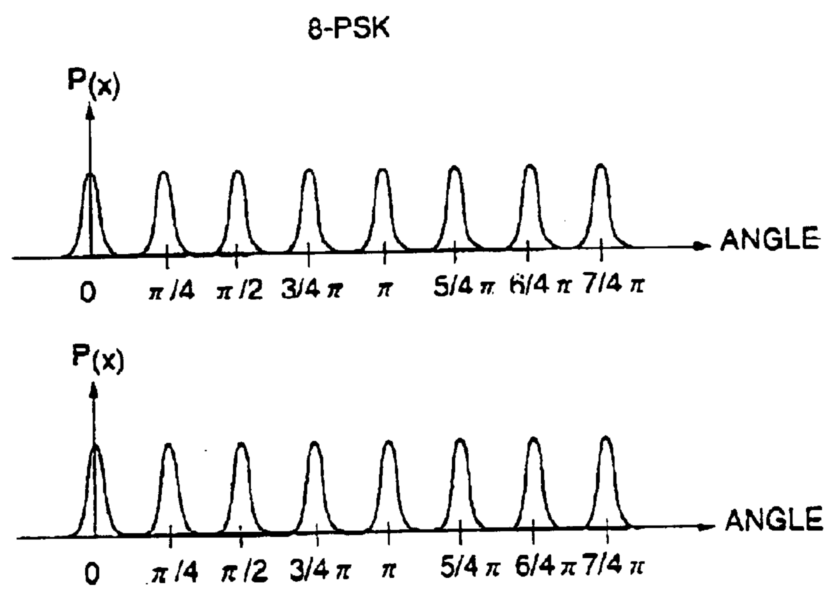

Owing to the characteristic mentioned above, as to the signal in which the carrier synchronization processing has been established by the assumed carrier wave synchronization processing circuit 35, the discrimination between the BPSK signal and the QPSK signal becomes possible from the signal symbol convergence position and its number. On the other hand, the convergence position and the number of the convergence points of the signal symbol in the π/4-shift QSPK signal and those in the 8-PSK signal are the same. However, if the signal symbol position at a certain time is made an (odd number)-th and that at a point toward which the time transmitted is made an (even number)-th, in then π/4-shift QSPK signal a number of the symbol convergence points capable of transiting for every one symbol of the signal symbol is 4 as shown in FIG. 12A and, further, there is a characteristic that the symbol convergence position of the (odd number)-th is different from that of the (even number)-th. On the other hand, in the 8-PSK signal, a number of the symbol convergence points capable of transiting for every one symbol of the signal symbol is 8 as shown in FIG. 12B and, further, there is no characteristic that the symbol convergence position of the (odd number)-th is different from that of the (even number)-th. Accordingly, it the signal after the carrier synchronization processing is parted to the (odd number)-th and the (even number)-th and their amplitude distribution characteristics are extracted, it becomes like FIG. 13A and FIG. 13B. Here, an axis of abscisses denotes a radian angle of the signal, and an axis of ordinates a generation probability of the signal.

As mentioned before, in the π/4-shift QSPK signal, the number of the signal symbol convergence points for every symbol of the (odd number)-th and the (even number)-th is 4 and, further, the convergence positions are different. On the other hand, in the 8-PSK signal, it is understood that the number of the signal symbol convergence points for every symbol of the (odd number)-th and the (even number)-th is always 8 and the convergence positions are the same. By utilizing such characteristics, the discrimination between the π/4-shift QSPK signal and the 8-PSK signal becomes possible. It is the amplitude distribution extraction circuit 36 that performs such a discrimination processing. The amplitude distribution extraction circuit 36 parts the signal symbol of the inputted reception signal to the (odd number)-th and the (even number)-th, and performs an amplitude distribution characteristic extraction processing for every one signal symbol.

From such characteristic extraction and analysis result of the assumed synchronization processing circuit 35 and the amplitude distribution extraction circuit 36 on the basis of an algorithm as mentioned above, the modulation type determination circuit 37 discriminates whether the reception signal is BPSK, QPSK, π/4-shift QSPK, 8-PSK and M-ary PSK of multi-level exceeding the last-mentioned one or an unknown (unclear) signal not corresponding to the former ones. Incidentally, on this occasion, similarly to the modulation type determination circuit 13 and the modulation type determination circuit 24 mentioned before, in the modulation type determination circuit 37, a discrimination accuracy is improved by using plural determination parameters, and a further improvement in the discrimination accuracy is intended by performing a weighting processing for the plural characteristics extraction result inputted to the modulation type determination circuit 37. Incidentally, as mentioned before, a weighting coefficient is found also from a result previously adjusted so as to optimally operate in the test using the test signal.

Here, the assumed synchronization processing in which, in the aforesaid case where the modulation type is unclear, the modulation type is assumed by such a modulation type as including all of the signal symbol convergence points of a modulation type discrimination object, the carrier synchronization processing is performed and, after stopping the signal rotation of the input signal, the modulation type is specified from the symbol convergence position and the number of the symbol convergence points, is one of the characteristics of this embodiment. Further, it is also a characteristic of this embodiment that the amplitude distribution characteristic is extracted for every one symbol, and the modulation type is discriminated from the symbol convergence position and the number of the symbol convergence points.

As to the reception signal discriminated as any one of BPSK, QPSK, π/4-shift QSPK, 8-PSK, M-ary PSK in the modulation type determination circuit 37, its discrimination result is outputted. On the other hand, the signal discriminated as an unknown signal is inputted to the backtracking circuit 38. Similarly to the backtracking circuit 25, the backtracking circuit 38 has stored the branch point (branch) of each determination processing and, in case where the unknown signal is inputted, switches the input signal such that a different processing is performed again by returning to that branch point. Here, when the unknown signal is returned to the point of the determination processing, in case where there are plural candidates, the backtracking circuit 38 computes a candidate having a highest possibility from a result obtained by the modulation type discrimination processing until that point of time, and switches the unknown signal.

The reception signal discriminated as the non-linear modulation type of digital modulation type by the analog/digital modulation type discrimination circuit 1 is inputted to the non-linear modulation type discrimination circuit 4. For the inputted reception signal, an FM detection processing is first performed by the FM detection circuit 41. Here, an output after the FM detection processing is a modulating (information) signal itself. In the non-linear modulation type, since the information signal is made an input signal and converted into a frequency information generally by using a VCO. M (number) frequencies are used for the modulation in the M-ary FSK signal (where, M>3), and 2 (two) frequencies are used for the modulation in the 2-FSK signal, the MSK signal and the GMSK signal.

Figure 14B:
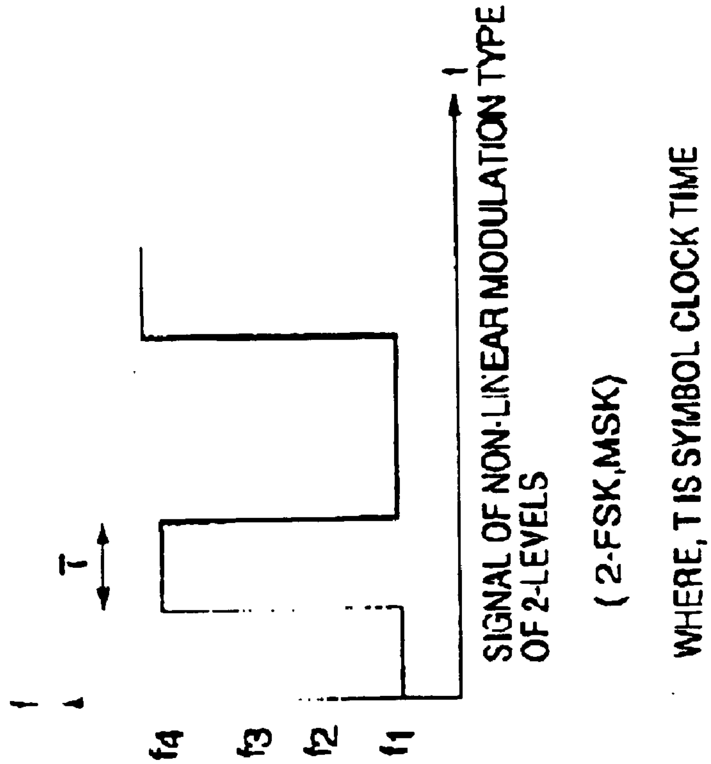
FIGS. 14A and 14B are views showing FM detection output examples with respect to a signal of a non-linear modulation type among the reception signals inputted to the automatic modulation type discrimination apparatus shown in FIG. 5.
Figure 14A:
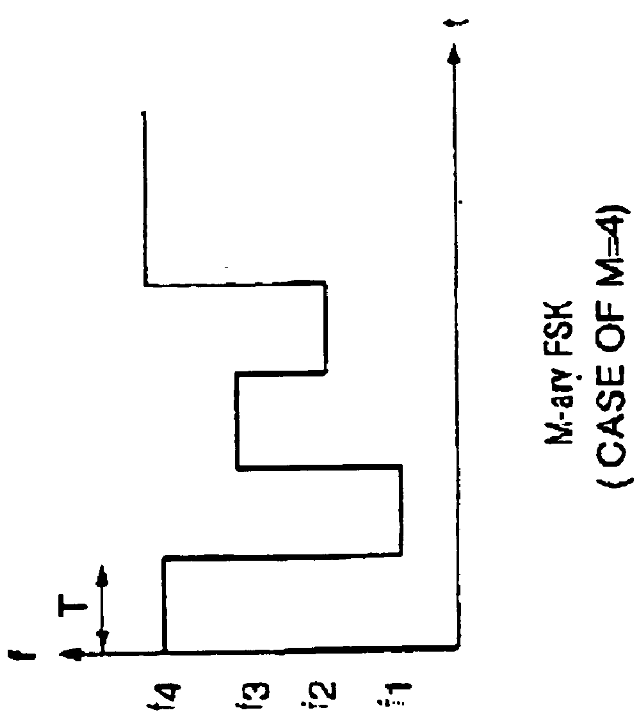

In FIG. 14A, there is shown an FM detection example of the modulating signal in which a rectangular signal of M-ary FSK is made the information signal. In FIG. 14B, there is shown an FM detection example of the modulating signal in which a rectangular signal of 2-FSK, MSK is made the information signal. Apparently, it is understood that the number of the used frequencies is different. Accordingly, as mentioned before, by finding the amplitude distribution of the FM detection output, it is possible to discriminate the M-ary FSK signal (M≧3) from a signal other than the former signal.

Concretely, a symbol clock signal is extracted from the FM detection output signal by the symbol clock extraction circuit 45. The re-sampling circuit 42 extracts a signal symbol from the input signal by using the symbol clock from the symbol clock extraction circuit 45. The amplitude distribution extraction circuit 43 finds a frequency from a phase deviation amount for every symbol from the extracted symbol, and extracts an amplitude distribution of a frequency signal thereof. In the modulation type determination circuit 44, a multi-level number is determined from the amplitude distribution extracted in the amplitude distribution extraction circuit 43, and the M-ary FSK signal (M≧3) is discriminated from a signal other than the former signal. As to the reception signal discriminated as the M-ary FSK signal its discrimination result is outputted.

On the other hand, the reception signal discriminated to be a signal of the modulation type other than M-ary FSK is inputted to the modulation index detection circuit 46. From the symbol clock (for example, T [symbol/s]) extracted in the symbol clock extraction circuit 45, a mark signal frequency fM and a frequency fS of a space signal obtained by the frequency analysis in the amplitude distribution circuit 43, the modulation index detection circuit 46 computes a maximum modulation index h by an equation (5) recited below.

$$h=|f_M-f_S|/T \tag{5}$$

Here, generally the modulation index of the FSK signal is optional, but each of the MSK signal and the GMSK signal is a modulation type in which the modulation index is made small until h=0.5 that is a limit of orthogonal condition of the signal. Accordingly, in the modulation type determination circuit 4, it is possible to discriminate the FSK signal from a signal other than the former signal by determining whether or not a value of the modulation index extracted by the modulation index detection circuit 46 is h=0.5. As a result, as to the reception signal discriminated as the FSK signal its discrimination result is outputted.

On the other hand, the reception signal discriminated as a signal of the modulation type other than FSK is inputted to the intersymbol interference analysis circuit 46 and the spectrum analysis circuit 49. The intersymbol interference analysis circuit 48 determines whether or not the reception signal is the GMSK signal by detection an existence/nonexistence of intersymbol interference of the reception signal in time axis. Concretely, in the GMSK signal, since the spectrum of an NRZ code which is the information signal is reshaped to a spectrum of Gaussian distribution shape function by using Gaussian filter, the signal symbol at a certain point of time is subjected to the intersymbol interference by the signal symbol in a past of the certain point of time and in a future of that point of time.

Here, an impulse response h(t) of the Gaussian filter is found by an equation (6) recited below.

$$h(t)=\frac{\alpha}{\sqrt{\pi}}e^{-\alpha^2t^2} \text{ where } \alpha=\pi\sqrt{\frac{2}{\ln 2}}Bb \tag{6}$$

Bb is 3 dB band width of Gaussian filter.

As mentioned above, an influence of the intersymbol interference is subjected to influences of the symbol in a past of the certain point of time and in a future of that point of time. As an example, the influence g(t) of the intersymbol interference at the certain time (a k) becomes, if it is assumed that it is subjected to the influences by past one symbol (a k−1) and next one symbol (a k+1), and influences of an inversion of the code are neglected, a combination of three of (A) to (C) recited below:

$$(ak-1, ak, ak+1) = (1, 1, 1)\ldots \quad (A)$$

$$= (-1, 1, 1)\ldots \quad (B)$$

$$= (-1, 1, -1)\ldots \quad (C)$$

where (A) means a repetition of "1" as the information symbol, (B) the repetition of "−1"—"1"—"1" as the informatiom symbol, and (C) the repetition of "−1"—"1"—"−1" as the information symbol.

The influence of the intersymbol interference in this case can be computed like an equation (7) recited below.

Here, as to the signal discriminated as the MSK signal and the GMSK signal, it is discrimination result is outputted, and the signal discriminated as an unknown signal is inputted to the backtracking circuit 51. Similarly to the backtracking circuits mentioned before, the backtracking circuit 51 has stored the branch point (branch) of each determination processing and, in case where the unknown signal is inputted, switches the signal such that a processing for a different modulation discrimination is performed again by returning to that branch point. And, when the unknown signal is returned to the point of the determination processing by the backtracking, in case where there are plural candidates, a candidate having a highest possibility is computed from a result obtained by the modulation type discrimination processing until that point of time, and the unknown signal is switched.

$$g(t) = \begin{cases} \pm erf(3x0)\ldots \text{ repetition of "1" as the information symbol} \\ \pm erf(x0)\ldots \text{ repetition of "−1"} \rightarrow \text{"1"} \rightarrow \text{"1" as the information symbol} \\ \pm[2erf(x0) - 2erf(3x0)]\ldots \text{ repetition of "−1"} \rightarrow \text{"1"} \rightarrow \text{"−1" as the information symbol} \end{cases} \quad (7)$$

$$\text{where } x_0 = \frac{\alpha T}{2} = 2.668BbT,\ erf(x) - \frac{2}{\sqrt{\pi}}\int_0^x e^{-\zeta^2}\,d\zeta$$

Accordingly, in the intersymbol interference analysis circuit 48, it is possible to determine an existence/nonexistence of the intersymbol interference of the reception signal in time axis by means of, for the reception signal, collating the intersymbol interference amount computed by such a technique as mentioned above.

On the other hand, the spectrum analysis circuit 49 performs a spectrum analysis for the inputted reception signal, and computes a BbT from a spectrum shape thereof. Here, Bb is a 3 dB band width of the signal, and I a symbol clock time. Generally, although the BbT of the MSK signal is infinity, the GMSK signal becomes a constant value because it is subjected to a band restriction by the Gaussian filter. Accordingly, the spectrum analysis circuit 49 determines an existence/nonexistence of the intersymbol interference by computing the BbT from the spectrum shape and collating it.

On the basis of the characteristic extraction and the analysis result of the intersymbol interference analysis circuit 48 and the spectrum analysis circuit 49, the modulation type determination circuit 50 performs, for the reception signal, the discrimination to the effect that it is the GMSK signal in case where it is recognized that the intersymbol interference owes to a characteristic of the Gaussian filter. In case where the intersymbol interference is not recognized, the modulation type determination circuit 50 further outputs a discrimination result to the effect that it is the MSK signal. Further, in case where it can be discriminated neither as the MSK signal or the GMSK signal, in which the intersymbol interference does not owe to the characteristic of the Gaussian filter, the modulation type determination circuit 50 discriminates that it is an unknown (unclear) signal. Incidentally, on this occasion, similarly to the modulation type determination circuit 13, the modulation type determination circuit 24 and the modulation type determination circuit 37, in the modulation type determination circuit 50, a discrimination accuracy is improved by using plural determination parameters, and a further improvement in the discrimination accuracy is intended by performing a weighting processing for the plural characteristics extraction result inputted to the modulation type determination circuit 50. Of course, as mentioned before, a weighting coefficient is found from a result adjusted so as to optimally operate in the test using the test signal.

Incidentally, in the modulation type discrimination processing and the characteristic extraction processing and the analysis processing, which have been mentioned until the above paragraph, it is also possible to realize the discrimination of high accuracy by means of performing the determination processing by using one of or combining a plurality of Al techniques (neural network technique, expert system, fuzzy techniques, GA technique and the like).

From the foregoing, by the operations as mentioned above, even in case where a communication wave whose communication elements are completely unknown is received, its modulation type becomes possible to be automatically discriminated.

Figure 15:
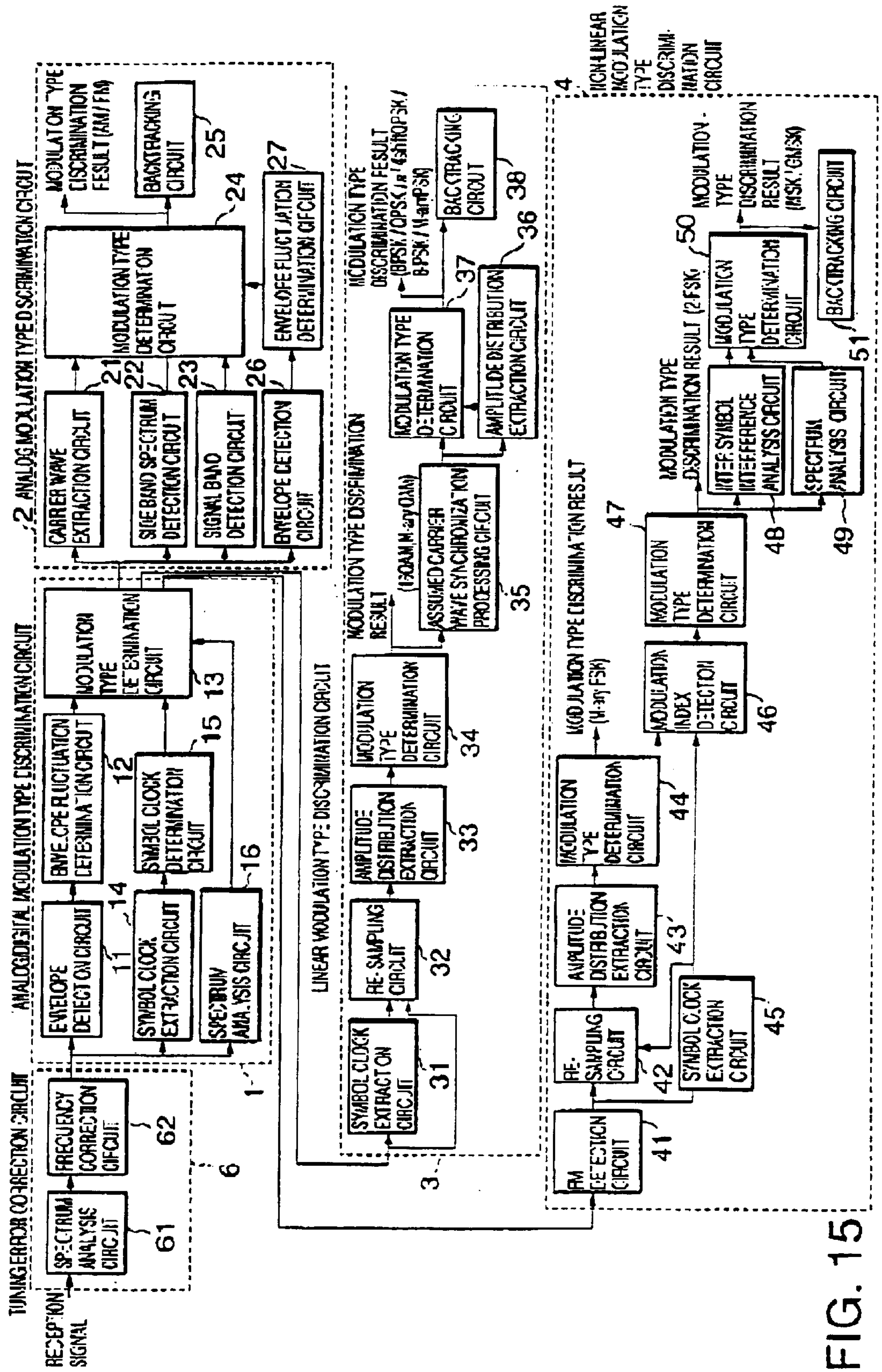
FIG. 15 is a block diagram showing a constitution of an automatic modulation type discrimination apparatus according to a second embodiment of the present invention.

A second embodiment of the present invention is explained by referring to FIG. 15. In the embodiment of the present invention, a turning error correction circuit 6 is added to the constitution of the first embodiment shown in FIG. 5. Since other constituent elements excluding the tuning error correction circuit 6 are completely the same as the first embodiment, detailed explanations are omitted.

In the first embodiment, in case where the communication wave of the unknown communication elements is received, on discriminating is modulation type, it is necessary that a frequency of the reception signal is completely tuned. Provisionally, in case where the tuning is insufficient, it is considered that its discrimination accuracy is influenced. In order to solve this problem, the tuning error correction circuit 6 is provided. The tuning error correction circuit 6 comprises a spectrum analysis circuit (spectrum analysis portion) 61 and a frequency correction circuit 62.

Concretely, by the spectrum analysis circuit 61, a spectrum extraction and analysis of the reception signal is performed, and a center frequency or a carrier wave frequency of the reception signal is detected. Thereafter, the frequency correction circuit 62 detects a tuning error from the detected center frequency and performs an error correction. Here, a technique such as FFT (FAST Fourier Transform) is used for a spectrum analysis, and the center frequency of the reception signal is computed from FFT calculation results of plural times. It is one of characteristics of this embodiment to intend an improvement in detection accuracy by utilizing the calculation results of plural times in this manner. Incidentally, it is considered to use an NCO (Numerical Control Oscillator) and the like for the frequency correction.

As mentioned above, by adding the tuning error correction circuit 6, it becomes possible to automatically detect and compensate the tuning error, so that the improvement in discrimination accuracy can be realized.

Further, the second embodiment has an effect that, even in case where the reception signal is switched to another signal and the frequency is changed, it can flexibly follow a change in the frequency.

Next, a third embodiment of the present invention is explained by referring to big 16. In the third embodiment, a storage circuit 7 is added to the constitution of the first embodiment shown in FIG. 5. That is, the storage circuits (first to third storage portions) 7 are respectively connected to the backtracking circuits 26, 38, and 51.

If a signal discriminated as unknown is inputted, each of the backtracking circuits 25, 38, 51 in this embodiment discriminates that it is a signal of the modulation type other than that made an object, stores the characteristic extraction and the analysis result (including the communication elements), which are obtained from various analyses, and thereby constructs a data base of self-regeneration type. By means of storing, by the backtracking circuit, the discrimination processing result of the reception signal switched to another determination processing to the storage circuit 7, this embodiment further has a characteristic that it is added to the data base. By this, in case where the unknown signal is inputted again to the backtracking circuit, by collating it with the information of the storage circuit 7 an optimum discrimination processing is provided, and it is possible to perform the discrimination processing equivalent to the signal having been made the object notwithstanding the fact that it is unknown (unclear). Besides, there are brought about effects that a kid of the signals capable of being dealt with is increased and an increase in efficiency (reduction in calculation amount) of the processing is made possible.

Incidentally, it is needless to say that the third embodiment can be used by being combined with the second embodiment.

Figure 17:
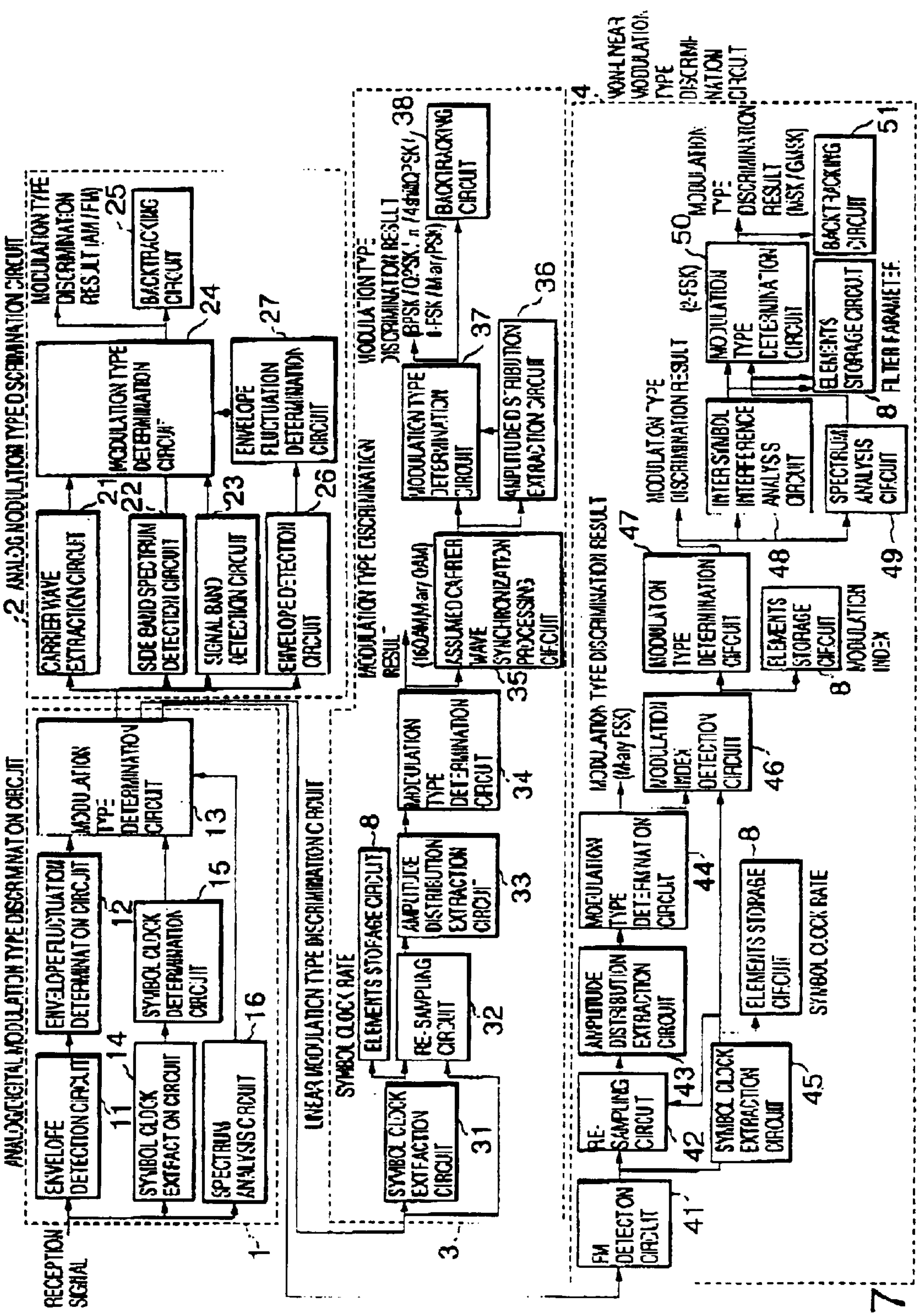
FIG. 17 is a block diagram showing a constitution of an automatic modulation type discrimination apparatus according to a fourth embodiment of the present invention.

Next, a fourth embodiment of the present invention is explained by referring to FIG. 17. In the fourth embodiment, elements storage circuits 8 are added to the constitution of the first embodiment shown in FIG. 5. That is, the elements storage circuit 8 is connected to the symbol clock extraction circuit 31 in the linear modulation type discrimination circuit 3. Further, the elements storage circuits 8 are connected respectively to the symbol clock extraction circuit 45 and the modulation index detection circuit 46 in the non-linear modulation type discrimination circuit 4, and the elements storage circuit 8 is connected, in common, to the intersymbol interference analysis circuit 48 and the spectrum analysis circuit 49.

The elements storage circuit 8 is, among the various characteristic extraction circuits of the reception signal, a circuit for storing the elements necessary for demodulating the reception signal, and makes a demodulation processing of the reception signal possible by summing the modulation type determination result and outputting that result to a receiver. For example in the digital modulation type, the elements necessary for demodulating the reception signal are a symbol clock rate, a modulation index, a filter parameter and the like. As a result, this embodiment has a new effect that not only the discrimination of the modulation type but also the demodulation processing of the reception signal are made possible. Further, by preliminarily storing the elements of communication service (for example, in case of PHS: modulation type π/-shift DQPSK, modulation speed 192 ksymbol/s, filter; roll-off filter, filter coefficient 0.5, etc.) to the elements storage circuit 8, there is obtained a new effect that it becomes possible to specify not only the modulation discrimination processing result but also the communication service. Incidentally, on this occasion, even if all of the communication elements do not accord, by computing its possibility, it is possible in case exceeding a threshold value to cause it to have a function of specifying as the service concerned.

Here, the demodulation processing can be realized by means of using a software reception device by the same apparatus.

Of course the fourth embodiment can be used by being combined with the second and third embodiments.

Figure 18:
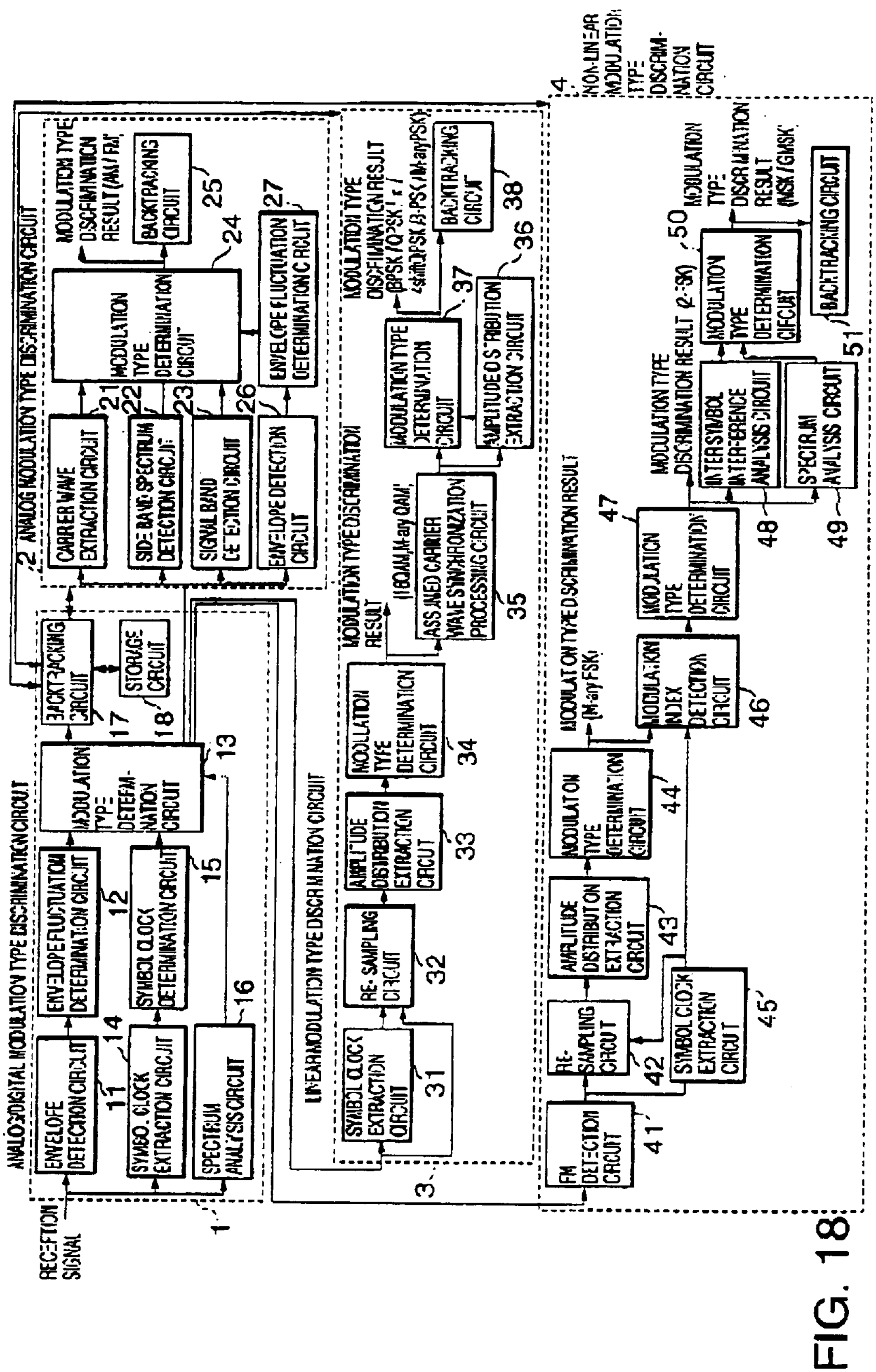
FIG. 18 is a block diagram showing a constitution of an automatic modulation type discrimination apparatus according to a fifth embodiment of the present invention.

Next, a fifth embodiment of the present invention is explained by referring to FIG. 18. In the fifth embodiment, a backtracking circuit (fourth backtracking portion) 17 and a storage circuit (fourth storage portion) 10 are added to the constitution of the first embodiment shown in FIG. 5. That is, the backtracking circuit 17 and the storage circuit 18 are connected to the modulation type determination circuit 13.

The first embodiment is constituted from a premise that it is possible to discriminate whether the reception signal is the analog modulation signal or the digital modulation signal and, in case where it is discriminated as neither of them, there is a possibility that the processing hangs up. In case where it is discriminated as neither the analog modulation signal nor the digital modulation signal, the reception signal is inputted to the backtracking circuit 17. Signal elements extracted and analyzed in the analog/digital modulation type discrimination circuit 1 are stored to the storage circuit 18, and they become data for collating when the same signal is inputted in next time. On the other hand, the backtracking circuit 17 outputs the reception signal to the analog modulation type discrimination circuit 2, the linear modulation type discrimination circuit 3 and the non-linear modulation type discrimination circuit 4 in order to performing the characteristic extraction and analysis processing of the reception signal, and stores the results thereof to the storage circuit 18.

The data stored in the storage circuit 18 are collated with the signal elements extracted and analyzed from the reception signal, and the reception signal is outputted to any one of the analog modulation type discrimination circuit 2, the linear modulation type discrimination circuit 3 and the non-linear modulation type discrimination circuit 4, or to the plural discrimination circuits.

By this, there are brought about effects that the processing does not hang up even in case where the signal not capable of being discriminated in the modulation type discrimination circuit 13 is inputted again, the unknown signal can be dealt with by performing a collation with the signal elements data extracted and analyzed from the reception signal, and a processing as the signal capable of being dealt with, which is seemed as if it has been previously registered, can be provided.

Further, by this processing, there is brought about an effect that a kind of signals capable of being dealt with can be increased.

Incidentally, the fifth embodiment can be used by being combined with the second, third and fourth embodiments.

Figure 19:
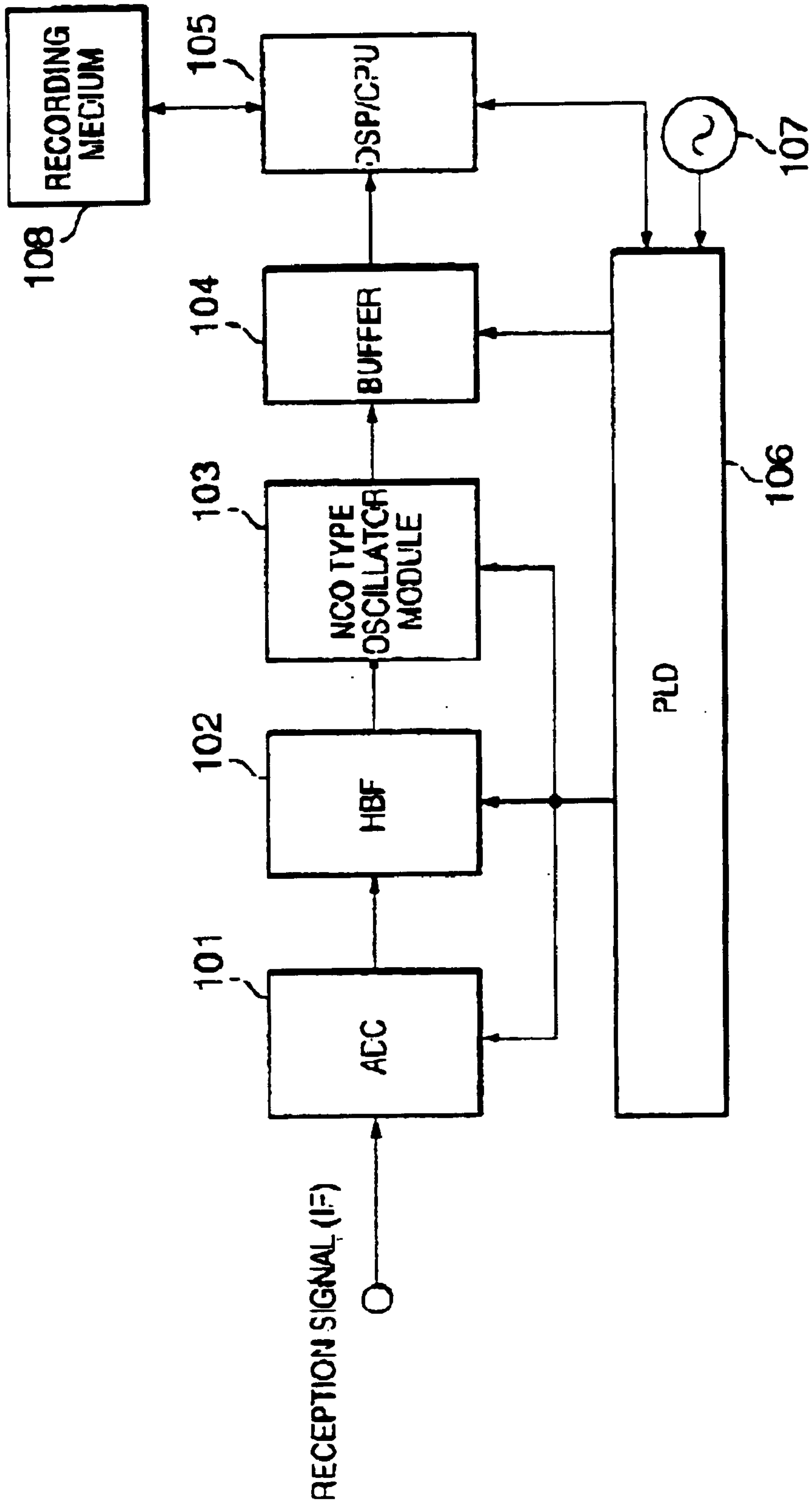
FIG. 19 is a block diagram showing a constitution of an automatic modulation type discrimination system using the automatic modulation type discrimination apparatus according to the present invention.

Next, an embodiment of an automatic modulation type discrimination system using the automatic modulation type discrimination apparatus mentioned above is explained by referring to FIG. 19. In FIG. 19, this system comprises an ADC (Analog Digital Converter) 101, an HBF (Half Band Filter) 102, an NCO type oscillator module 103, a buffer 104, a DS/CPU (Digital Signal Processor/Central Processing Unit) 105, a PLD (programmable Logic Device) 106, and a clock signal generator 107. The ADC 101 quantizes an analog signal of intermediate frequency (IF) to a digital signal. The HBF 102 performs an orthogonal transformation processing for converting the quantized signal of intermediate frequency into a complex signal of a base band zone, an LPF (Low Pass Filter) processing, and a thinning processing of 2 (two). The oscillator module 103 compensates an error of tuning frequency. The buffer 104 is one for temporarily storing the data and smoothly flowing the signal to the DSP/CPU 105. The DSP/CPU 105 is one for performing the modulation type discrimination processing mentioned before. The PLD 106 is one for internally frequency-dividing a clock signal of the clock signal generator 107 and supplying it to each element.

Next, an operation of this system is detailedly explained. In FIG. 19, it is the DSP/CPU 105 that realized the function of each of the embodiments mentioned before, and all processings are realized by a digital signal processing technique. In case where a processing in real time is taken into consideration, the DSP/CPU 105 becomes a parallel processing using plural elements. By the digital signal processing technique, the ADC 101 has a function of quantizing an analog signal received by an antenna in order to realize this embodiment to the digital signal.

However, in this embodiment, the convention processing to a frequency of base band vicinity of the input signal is realized by means of using a signal obtained by frequency-dividing the signal of the clock signal generator 107 by the PLD 106 and, when quantizing, performing an under-sampling (band-pass sampling) to thereby egree with the quantization.

The HGF 102 is used for the purposes of reducing a calculation amount in the DSP/CPU 105 and extracting the complex signal which becomes necessary when, in this embodiment, extracting the communication elements such as phase and frequency of the signal. The HBF 102 realized a frequency down convert processing of ¼ of sampling frequency, an LPF processing, and the thinning processing of 2 (two) of the quantization signal, which becomes possible accompanying with the matters mentioned above.

The oscillator module 103 realizes the function of the tuning error correction circuit 6 shown in the second embodiment of the present invention by operating in conjunction with the DP/CPU 105. Concretely, a spectrum analysis (role of the spectrum analysis circuit 61) of the reception signal is performed by the DSP/CPU 105, and a compensation of the tuning error obtained by the spectrum analysis is digitally realized by the oscillator module 103. By this, the reception signal becomes a complex signal subjected to the signal tuning processing of the base band zone. The buffer 104 temporarily stores an output signal from the oscillator module 103, and performs a synchronization processing for smoothly inputting the signal to the DSP/CPU 105. The PLD 106 supplies a clock suitable for each element by internally frequency-dividing a clock of the clock signal generator 107. By adopting the constitution mentioned above, this embodiment can be realized.

Especially, the hardware constitution for unitarily realizing the modulation type discrimination processing and efficiently performing it by using the digital signal processing technique, and the signal processing technique become the characteristics.

Incidentally, in order to implement, for the DSP/CPU 105, a discrimination processing operation mentioned later, a recording medium 108 in which a discrimination processing program has been recorded is provided. The recording medium 108 is realizes by a magnetic disc, a semiconductor memory, and other recording mediums.

Figure 20:
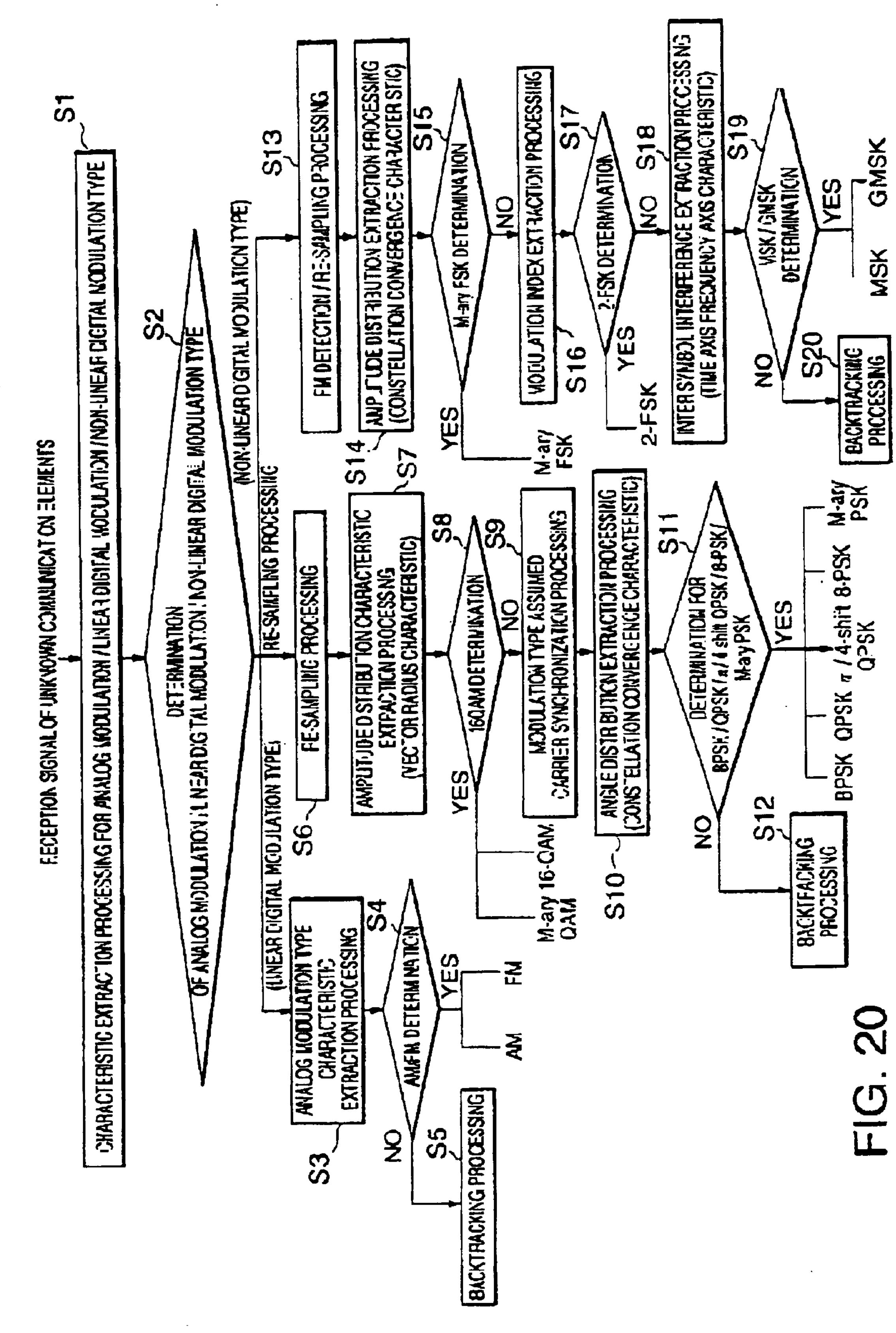
FIG. 20 is a flowchart diagram for explaining a flow of automatic modulation type discrimination processing operations according to the present invention.

FIG. 20 is a flowchart diagram showing a flow of an automatic modulation type discrimination processing operation by the discrimination processing program recorded in the recording medium 108. The discrimination processing program is read from the recording medium 108 to the DSP/CPU 105 thereby controlling an operation of the DSP/CPU 105.

Referring to FIG. 20, in a step S1, a plural characteristics extraction and analysis processing for the reception signal are performed by the envelope detection circuit 11, the envelope devlation determination circuit 12, the symbol clock extraction circuit 14, the symbol clock determination circuit 15 and the spectrum analysis circuit 16 in the analog/digital modulation type discrimination circuit 1. In a step S2, on the basis of the extracted plural characteristics and analysis result, by the modulation type determination circuit 13 it is determined whether the reception signal is the analog modulation type, the linear modulation type of digital modulation type or the non-linear modulation type by digital modulation type.

In case where in the step S2 the reception signal is determined as one by analog modulation type, it proceeds to a step S3. In the step S3, the plural characteristics extraction and analysis processing for the reception signal is performed by the carrier wave extraction circuit 21, the side band spectrum detection circuit 22, the signal band detection circuit 23, the envelope detection circuit 26 and the envelope fluctuation determination circuit 27 in the analog modulation type discrimination circuit 2. In a step S4, on the basis of the extracted plural characteristics and the analysis result, by the modulation type determination circuit 24 it is determined whether the reception signal is the AM modulation type or the FM modulation type. In case where in the step S4 the reception signal is determined to be an unknown signal which is neither the AM modulation type nor the FM modulation type, it proceeds to a step S5 where a backtracking processing is performed.

In case where in the step S2 the reception signal is determined to be the linear modulation type by digital modulation type, it proceeds to a step S6. In the step S6, a re-sampling processing including a symbol clock extraction and a signal symbol extraction is performed by the symbol clock extraction circuit 31 and the re-sampling circuit 32 in the linear modulation type discrimination circuit 3. Subsequently, in a step S7, a symbol vector radius is computed by the amplitude distribution extraction circuit 33 and, further, a processing for extracting its amplitude distribution characteristic is performed. In a step S8, on the basis of the extracted amplitude distribution characteristic the modulation type determination circuit 34 determines whether the reception signal is the 16 QAM signal and the M-ary QAM signal, or a signal other than the former signals. In case where in the step S8 the reception signal is determined to be the linear modulation type signal other than the 16 QAM signal and the M-ary QAM signal, it proceeds to a step S9. In the step S9, a modulation type is assumed by the assumed carrier wave synchronization processing circuit 35, and a carrier wave synchronization processing is performed. Subsequently, in a step S10, a processing for extracting amplitude distributions of the (odd number)-th signal symbol and the (even number)-th signal symbol is performed by the amplitude distribution circuit 36. In a step S11, on the basis of the extracted amplitude distributions, the modulation type determination circuit 37 determines whether the reception signal is the BPSK signal, the QPSK signal, the π/4-shift QPSK signal or the 8-PSK signal. In case where in the step S11 the reception signal is determined to be an unknown signal which is none of the BPSK signal, the QPSK signal, the π/4-shift QPSK signal, the 8-PSK signal and the M-ary PSK signal, it proceeds to a step S12. In the step S12, a backtracking processing by the backtracking circuit 38 is performed.

In case where in the step S2 the reception signal is determined to be the non-linear modulation type by digital modulation type, it proceeds to a step S13. In the step S13, an FM detection, a symbol clock extraction and a re-sampling processing are first preformed by the FM detection circuit 41, the symbol clock extraction circuit 45 and the re-sampling circuit 42 in the non-linear modulation type discrimination circuit 4. Subsequently, in a step S14, an amplitude distribution extraction processing for a multi-level number determination in the non-linear modulation type from the re-sampled signal is performed by the amplitude distribution extraction circuit 43. In a step S15, by the fact that, on the basis of the extracted amplitude distribution, the modulation type determination circuit 44 performs the multi-level number determination, it is determined whether the reception signal is the M-ary FSK signal or a signal other than the former signal. In case where in the step S15, the reception signal is determined to be a signal other than the M-ary FSK signal, it proceeds to a step S16. In the step S16, on the basis of a symbol clock extracted in the symbol clock extraction circuit 45, a modulation index of the reception signal is detected by the modulation index detection circuit 46. In a step S17, on the basis of the detected modulation index, the modulation type determination circuit 47 determines whether the reception signal is the 2-FSK signal or a signal other than the former signal. In case where the reception signal is determined to be a signal other than the 2-FSK signal, it proceeds to a step S18 where an intersymbol interference in time axis and an intersymbol interference in frequency axis are analyzed by the intersymbol interference analysis circuit 48 and the spectrum analysis circuit 49. In a step S19, by an analysis result in the step S18, the modulation type determination circuit 50 determines whether the reception signal is the MSK signal, the GMSK signal or an unknown signal. In case where in the step S19, the reception signal is determined to be an unknown signal, it proceeds to a step S20. In the step S20, a backtracking proceeding by the backtracking circuit 51 is performed.

Figure 21:
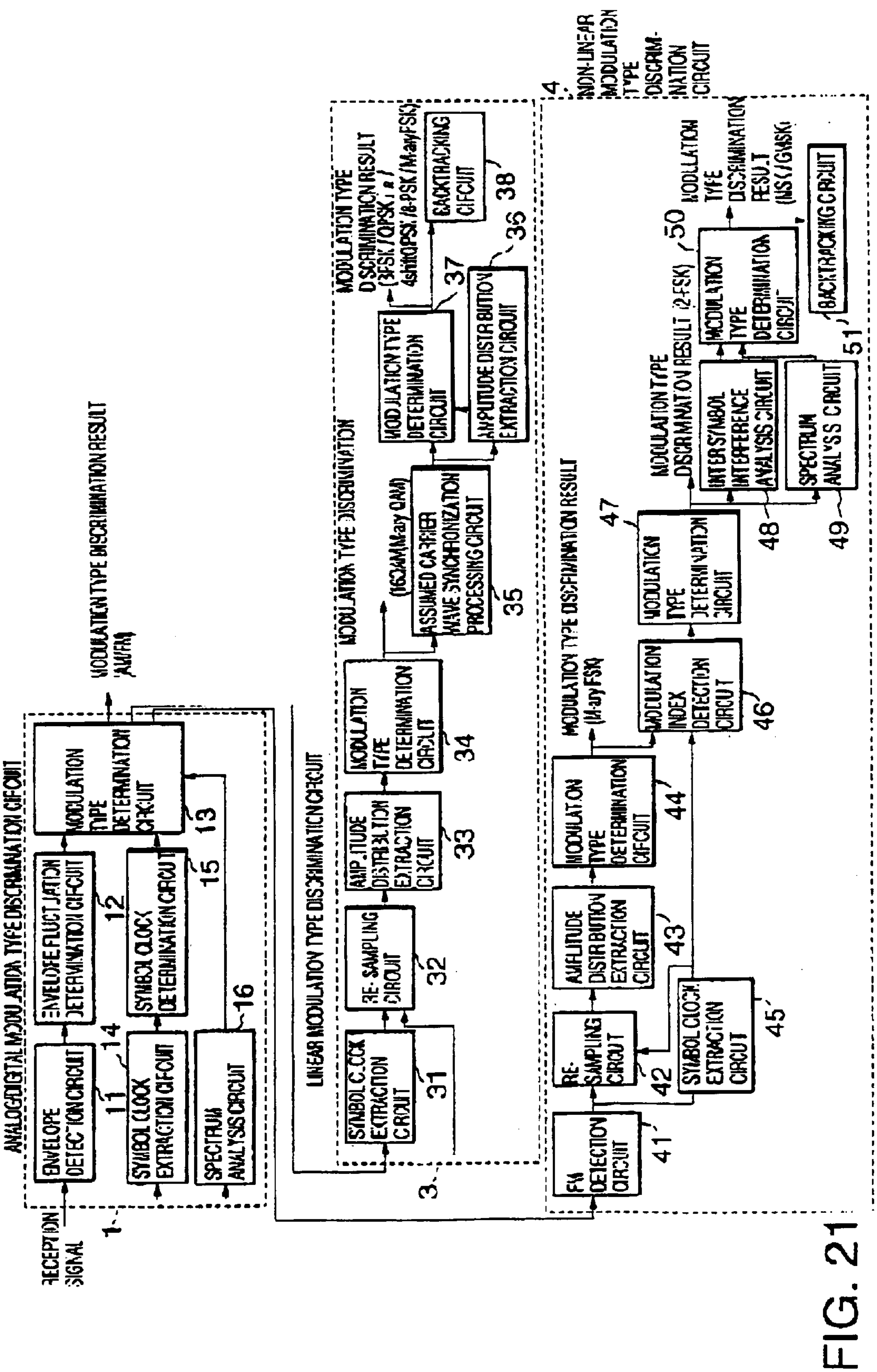
FIG. 21 is a block diagram showing a constitution of an automatic modulation type discrimination apparatus according to a sixth embodiment of the present invention.

Next, a sixth embodiment of the present invention is explained by referring to FIG. 21. This embodiment may be said to be a modification of the first embodiment of FIG. 5. That is, this embodiment is based on the fact that, in the modulation type determination circuit 13 in the analog/digital modulation type discrimination circuit 1, also the FM modulation signal and the AM modulation signal of analog modulation type can be discriminated by using the envelope, the symbol clock and the spectrum characteristic of the reception signal. In this case, although a discrimination accuracy of the FM modulation signal and the AM modulation signal is low in comparison with the analog modulation type discrimination circuit 2 of FIG. 5, there is no change in the fact that the discrimination is possible. Of course, this embodiment can be used by being combined with the aforesaid second to fifth embodiments, and can be applied also to the discrimination system shown in FIG. 19. In this case, the discrimination processing program recorded in the recording medium 108 determines, in the step S2 among the steps S1 to S20 shown in FIG. 20, whether the reception signal is the FM modulation signal of analog modulation type, the AM modulation signal of analog modulation type, the linear modulation type by digital modulation type or the non-linear modulation type by digital modulation type. And, the steps S3 to S5 of FIG. 20 are omitted, and the steps S6 to S20 of FIG. 20 are implemented in this embodiment respectively as the steps S3 to S17.

Figure 22:
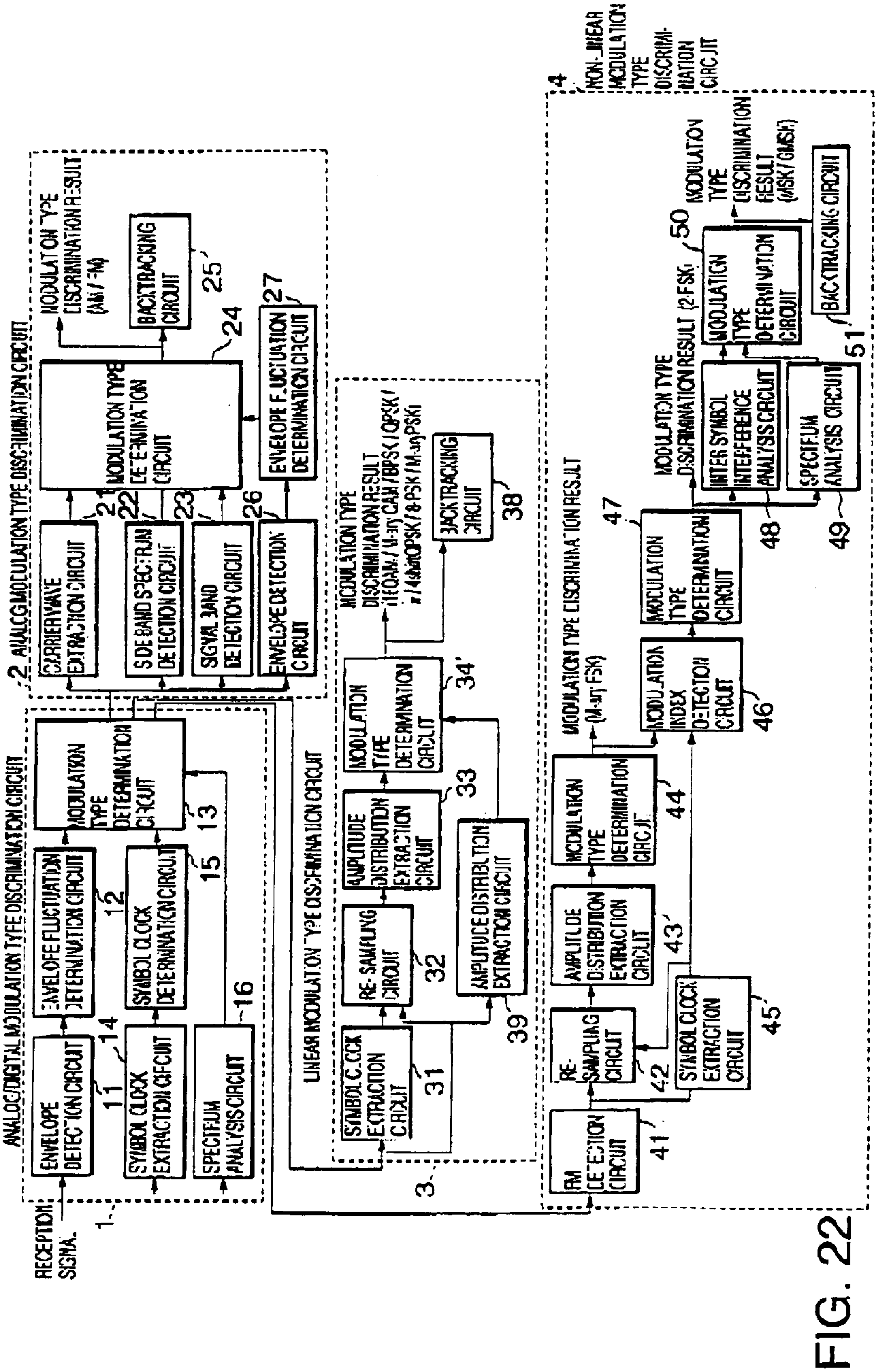
FIG. 22 is a block diagram showing a constitution of an automatic modulation type discrimination apparatus according to a seventh embodiment of the present invention.

FIG. 22 shows a seventh embodiment of the present invention set forth in each of claims 10, 23 and 50. In FIG. 22, in this embodiment, a constitution of the linear modulation type discrimination circuit 3 is different from that of the first embodiment shown in FIG. 5. Concretely, the linear modulation type discrimination circuit 3 comprises the symbol clock extraction circuit 31, the re-sampling circuit 32, the amplitude distribution extraction circuit 33, an amplitude distribution extraction circuit (third amplitude distribution extraction portion) 39, a modulation type determination circuit (length modulation type determination portion, but in case where combined with a later-mentioned embodiment of FIG. 25, fourth modulation type determination portion) 34', and the backtracking circuit 38 (second backtracking circuit in claims 10 and 23, and first backtracking portion in claim 50).

The symbol clock extraction circuit 31 regenerates and extracts the symbol clock from the reception signal. The re-sampling circuit 32 re-samples the reception signal on the basis of the extracted symbol clock, and extracts an information-superimposed signal symbol. The amplitude distribution extraction circuit 33 computes a symbol vector radius from an extraction result of the re-sampling circuit 32, and extracts its amplitude distribution. The amplitude distribution extraction circuit 39 analyzes the amplitude distribution of the reception signal. On the basis of an extraction result of the amplitude distribution extraction circuit 33 and an analysis result of the amplitude distribution extraction circuit 39, the modulation type determination circuit 34' discriminates whether the reception signal is the 16 QAM signal, the M-ary QAM signal of multi-level exceeding 16-levels, the BPSK signal, the QPSK signal, the π/4-shift QPSK signal, the 8-PSK signal, the M-ary PSK signal of multi-level exceeding 8-levels or an unknown signal not corresponding to the former signals. The backtracking circuit 38 stores a branch point (branch) of each determination processing at the modulation type determination circuit 34' and, in case where it is discriminated to be the unknown signal, switches the reception signal such that a processing for discriminating the different modulation type is performed again by returning to that branch point.

Figure 23:
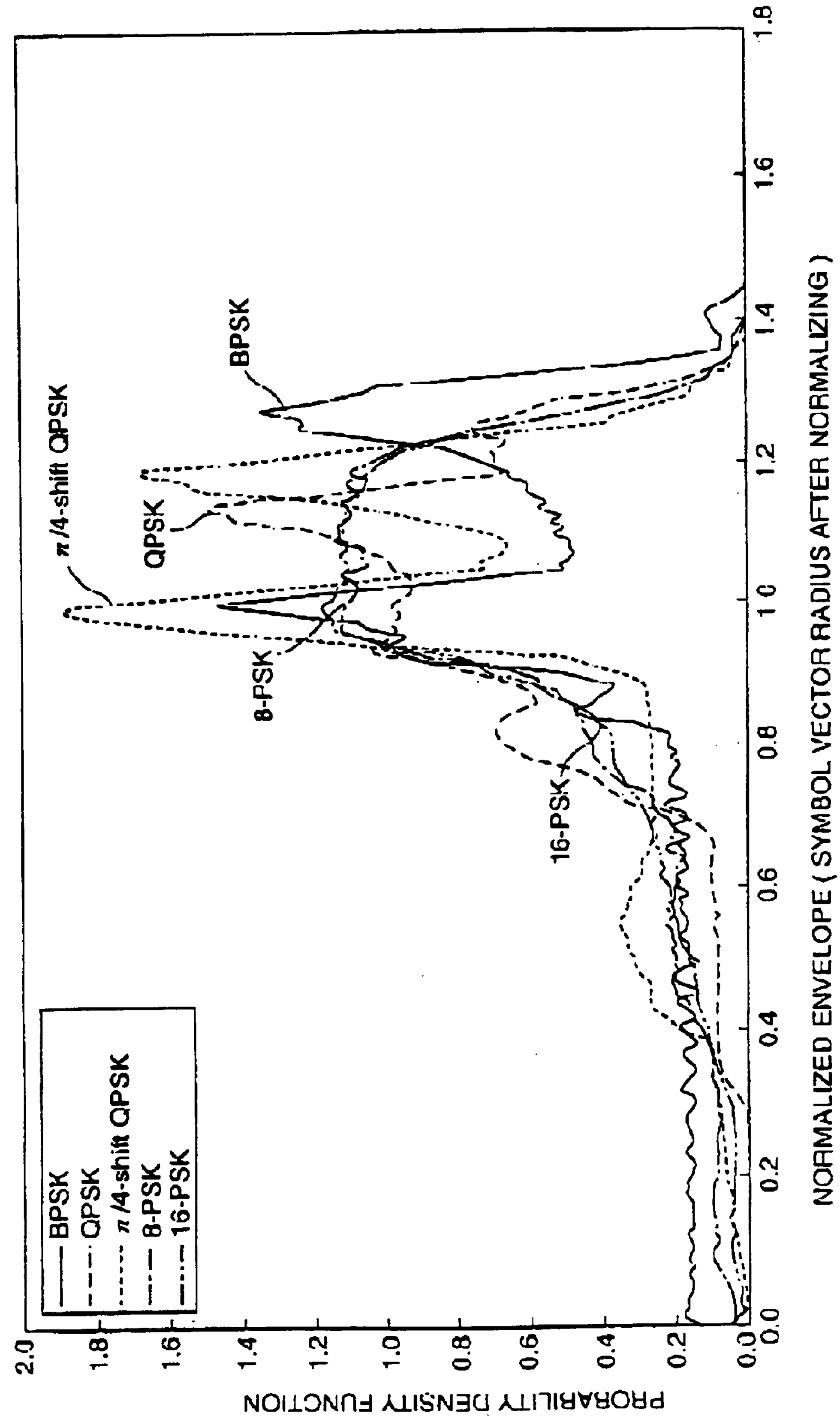
FIG. 23 is a view showing amplitude distribution characteristics of the symbol vector radius of the reception signal before a re-sampling in order to explain operations of a modulation type determination circuit in a linear modulation type discrimination circuit of FIG. 22.
Figure 24:
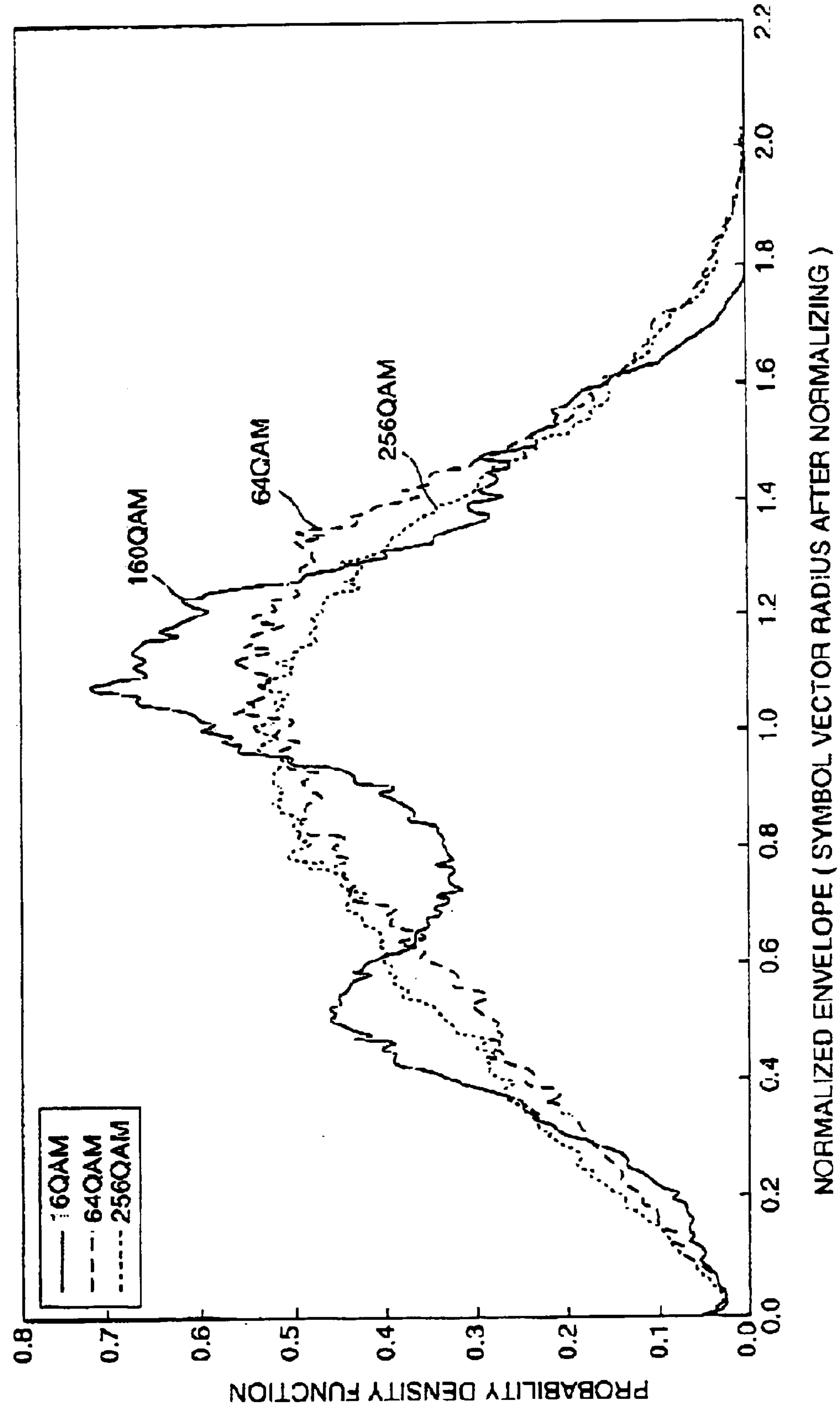
FIG. 24 is a view showing amplitude distribution characteristics of the symbol vector radius of the reception signal before the re-sampling in order to explain operations of the modulation type determination circuit in the linear modulation type discrimination circuit of FIG. 22.

The amplitude distribution extraction circuit 39 in this embodiment analyzes an amplitude distribution characteristic of the reception signal before the re-sampling processing is performed. As shown in FIG. 23 and FIG. 24, the amplitude distribution characteristic of the symbol vector radius before the re-sampling has an inherent amplitude characteristic for every modulation type and owing to, even if for the same modulation type, its multi-level number. That is, from the amplitude distribution characteristic, the discrimination of the linear modulation type by digital modulation type is possible. A more concrete discrimination method is as follows. An amplitude distribution waveform normalized for every modulation type having been made an object is previously prepared in the modulation type determination circuit 34', and the discrimination is possible by collating the amplitude distribution waveform, in its correlation, with an output of the amplitude distribution extraction circuit 39. Incidentally, in each of FIG. 23 and FIG. 24, the axis of abscissas denotes a symbol vector radius after the normalizing, and the axis of ordinates a probability density function. Further, measurements are performed under conditions that a filter type is a route nyquist filter and a roll-off rate (α)=0.5. Especially, in this embodiment, since it is adapted such that the collation is performed combining with the amplitude distribution characteristic after the re-sampling by the fact that the re-sampling circuit 32 and the amplitude distribution extraction circuit 34 are provided, an improvement in discrimination accuracy can be intended. In reversely mentioning, depending on circumstances, the re-sampling circuit 32 and also the amplitude distribution extraction circuit 34 may be omitted.

Of course, this embodiment can be used by being combined with the second to sixth embodiments mentioned before, and can be applied also to the discrimination system shown in FIG. 19. In this case, as to the discrimination processing program recorded in the recording medium 108, the steps S9 to S12 among the steps S1 to S20 shown in FIG. 20 are omitted and, after the step S7, an analysis step by the amplitude distribution extraction circuit 39 is implemented. And, after this step, the aforesaid determination operation by the modulation type determination portion 34' is implemented.

Figure 25:
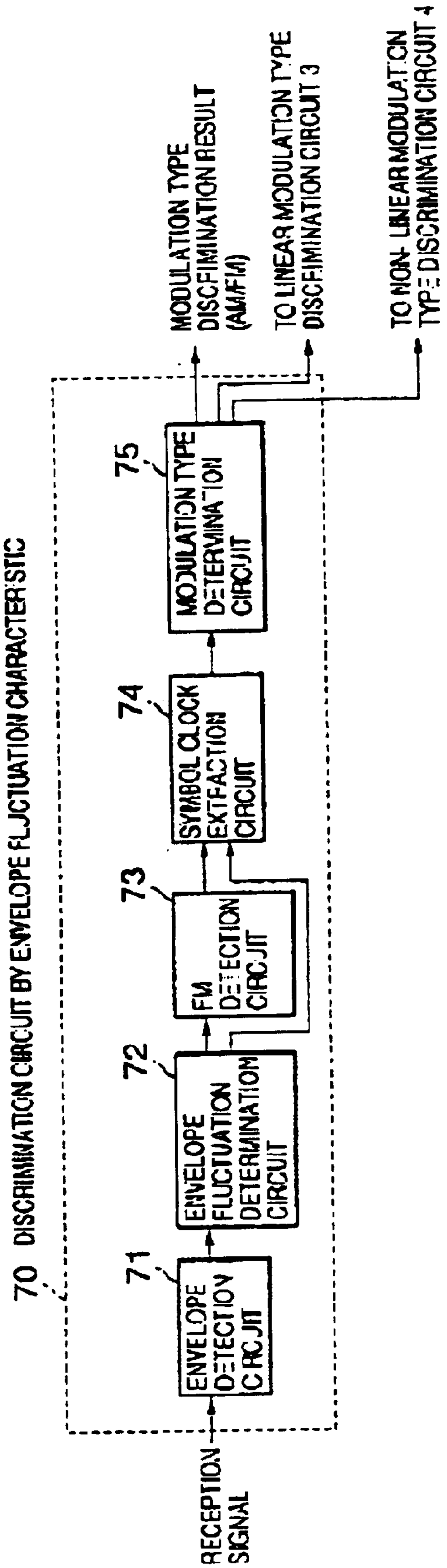
FIG. 25 is a block diagram showing a constitution of an automatic modulation type discrimination apparatus according to an eighth embodiment of the present invention.
Figure 26:
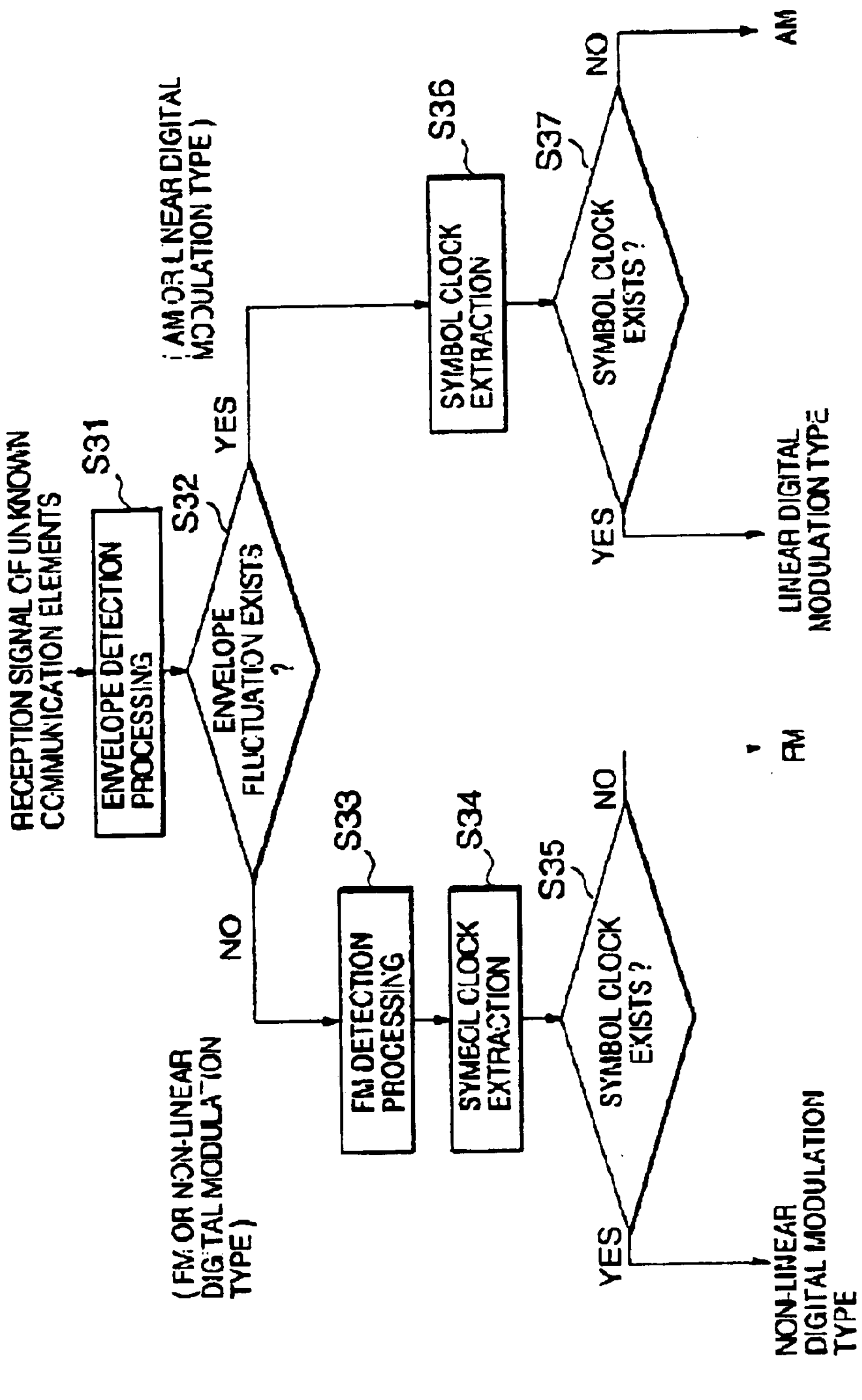
FIG. 26 is a flowchart diagram for explaining a flow of automatic modulation type discrimination processing operations according to the embodiment of FIG. 25.

Next, an eighth embodiment of the present invention, set forth in claim 45 is explained by referring to FIG. 25 and FIG. 26. In this embodiment, a discrimination circuit 70 by an envelope fluctuation characteristic is provided in place of the analog/digital modulation type discrimination circuit 1 in the first embodiment of FIG. 5. The discrimination circuit 70 comprises and envelope detection circuit 71, an envelope fluctuation determination circuit 72, an FM detection circuit 73, a symbol clock extraction circuit 74, and a modulation type determination circuit (first modulation type determination portion) 75.

A detection processing of the envelope is implemented for the reception signal by the envelope detection circuit 71 (a step S31 of FIG. 26) (a first step), and an existence/nonexistence of the envelope fluctuation is determined by the envelope fluctuation determination circuit 72 (a step S32) (a second step). As to the signal determined to have no envelope fluctuation, an FM detection processing is performed by the FM detection circuit 73 (a step S33) (a third step), and a symbol clock is extracted by the symbol clock extraction circuit 74 (a step 34) (a fourth step). Also as to the signal determined to have the envelope fluctuation, the symbol clock is extracted by the symbol clock extraction circuit 74 (a step S36) (a fifth step). In the modulation type determination circuit 75, from an existence/nonexistence of the symbol clock it is discriminated in steps S35 and S37 whether the reception signal is the AM modulation signal, the FM modulation signal, the linear modulation signal by digital modulation type or the non-linear modulation signal by digital modulation type, and a discrimination result is outputted (a sixth step). Incidentally, in case where in the step S37, the reception signal is discriminated to be the linear modulation signal of digital modulation type, it proceeds to the step S6 in FIG. 20, and the steps S6 to S12 are implemented as seventh to thirteenth steps. On the other hand, in case where in the step S3 the reception signal is discriminated to be the non-linear modulation signal of digital modulation type, it proceeds to the step S13 in FIG. 20, and the steps S13 to S20 are implemented as fourteenth to twenty-first steps.

Figure 16:
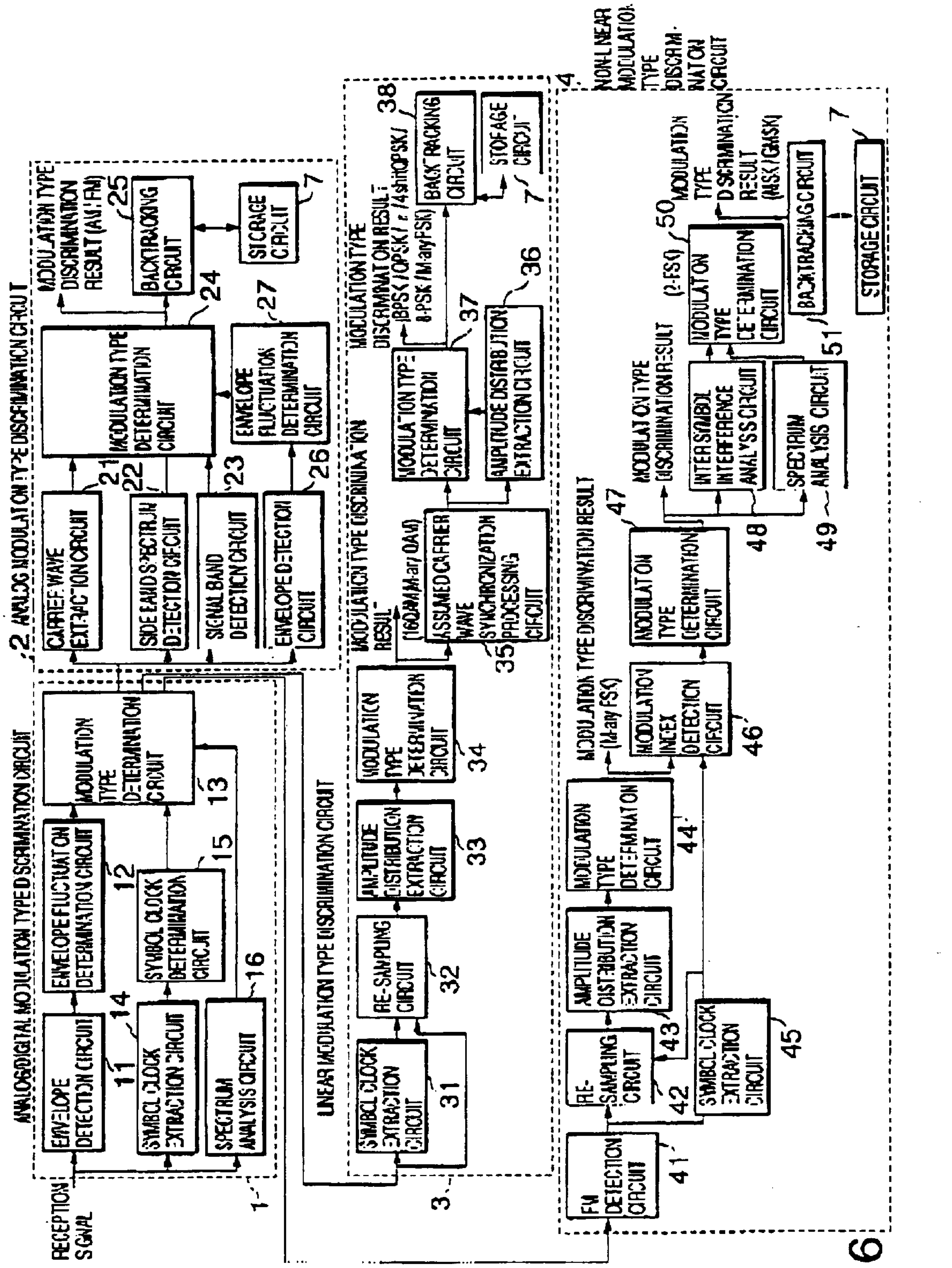
FIG. 16 is a block diagram showing a constitution of an automatic modulation type discrimination apparatus according to a third embodiment of the present invention.

Needless to say, the eighth embodiment can be used by being combined with the second to sixth embodiments mentioned before, and can be applied also to the discrimination system shown in FIG. 19. In this case, as to the discrimination processing program recorded in the recording medium 108, steps S31 to S37 are implemented in place of the steps S1 to S5 shown in FIG. 20 and, after the steps S35 and S37, the steps S6 to S20 of FIG. 20 are implemented. For example, in case where this embodiment is combined with the third embodiment shown in FIG. 16, since the analog modulation type determination circuit 2 is omitted, the modulation type determination circuit 13 becomes a first modulation type determination portion, the modulation type determination circuit 34 a second modulation type determination portion, and the modulation type determination circuit 37 a third modulation type determination portion. Further, in case where this embodiment is combined with the seventh embodiment shown in FIG. 22, the modulation type determination circuit 34' becomes a fourth modulation type determination portion (claim 50), not an eighth one. On the other hand, in either of FIG. 16 and FIG. 22, the modulation type determination circuits 44, 47 and 50 become respectively fifth, sixth and seventh modulation type determination portions.

In the first embodiment shown in FIG. 5, the discrimination of the analog/digital modulation type is performed by using three parameters of the envelope fluctuation characteristic, the spectrum characteristic and the symbol clock characteristic. On the other hand, by first paying attention to the envelope fluctuation characteristic of the reception signal, in the eighth embodiment, the FM modulation signal of the analog modulation type whose envelope is a constant envelope fluctuation and the non-linear digital modulation type are discriminated from the AM modulation signal of the analog modulation type whose envelope is an inconstant envelope fluctuation and the linear digital modulation type. Thereafter, the discrimination between the analog modulation type and the digital modulation type is performed by an existence/nonexistence of the symbol clock. However, for the reception signal determined as a constant envelope, an FM detection processing is preferentially performed and, thereafter, a symbol clock extraction processing is performed. This is because the signal of the constant envelope is a signal of the FM modulation system.

According to this embodiment, in comparison with the first embodiment, the analog modulation type discrimination circuit 2 is unnecessary, and it is apparent that the linear modulation type discrimination circuit 3 and the non-linear modulation type discrimination circuit 4 shown in FIG. 5 are connected to the modulation type determination circuit 75. Further, a constitution of the discrimination circuit 70 can be simplified in comparison with that of the analog/digital modulation type discrimination circuit 1 in FIG. 5, so that a miniaturization of the apparatus can be realized along with a reduction in processing calculation amount.

As explained above, according to the present invention, the following effects are obtained.

A first effect is the fact that the reception signal of plural modulation types whose communication elements are unknown is automatically discriminated, and its modulation type can be specified. By this, the discrimination of plural modulation types is possible by a single apparatus, and a miniaturization and an increase in efficiency of the apparatus can be realized. This is because, on performing the modulation type discrimination processing, by paying attention to the characteristic possessed by each modulation type, there are provided means for extracting and analyzing that characteristic and processing means (including also the circuit constitution) for discriminating the modulation type by using that characteristic.

A second effect is the fact that pre-informations, such as communication elements, for preliminarily obtaining modulation data are not required. This is because hitherto the modulation type discrimination processing has been performed by using modulation data and synchronization data or the like, but in the present invention the modulation type discrimination processing is performed by using the characteristic possessed by the signal of each modulation type before the demodulation.

A third effect is the fact that the modulation type discrimination processing can be performed by the plural modulation type discrimination circuits, not only by the single processing circuit. By this, even if the discrimination processing is failed by a certain modulation type discrimination circuit, this can be covered by another modulation type discrimination circuit, so that the discrimination accuracy can be improved. This is because, for the unknown (unclear) signal which can not be discriminated as a result of each modulation type discrimination processing, there is provided the backtracking circuit for performing the processing of switching it to another modulation type discrimination circuit having a highest discrimination probability.

A fourth effect the fact that it is possible to flexibly follow a change in elements, such as the modulation type discrimination processing, of the reception signal. By this, even in case where the reception signal having been made a discrimination object is changed to a signal of another modulation type or where although it is the same modulation type, another communication elements are changed, it is possible to deal with it. This is because, in the modulation type discrimination processing, it is a premise to extract and analyze the communication elements of the reception signal, and means (circuit) therefore is possessed. Further, this is because there is provided means (circuit) for, form the extracted result, following it, e.g., the symbol clock extraction circuit, the re-sampling circuit or the tuning error correction circuit.

A fifth effect is the fact that, even in case where a signal of the modulation type other than the discrimination object is received, the characteristic extraction and the analysis of that signal are possible, so that it can be dealt with as a new modulation type. By this, even in case where the signal of the modulation type other than the discrimination object is received again, it can be processed as a signal capable of being discriminated, so that a flexibility and a developability can be given to the apparatus. This is because there are provided means for storing, as a new signal, the characteristic extraction result of the reception signal discriminated as an unknown (unclear) signal to the backtracking circuit, and means for tracing and storing a result switched to another discrimination processing circuit as the unknown signal by the backtracking circuit.

A sixth effect is the fact that, in the modulation type discrimination processing, the modulation type discrimination of high accuracy can be made by means of performing the discrimination by using plural characteristics extraction and, additionally on this occasion, performing the weighting processing for that characteristics extraction. This is because, in the modulation type discrimination method of the present invention, paying attention to the plural characteristics possessed by each modulation type, there is means for extracting and analyzing them and, on discriminating, there is a function of deciding and weighting a weight (certainty) for the plural characteristics extraction result by previously performing the test using the test signal.

A seventh effect is the fact that besides the modulation type discrimination of the reception signal, it is possible to store and output the communication elements for demodulating the reception signal. By this, an integration of the modulation type discrimination apparatus and the reception device (demodulator) becomes possible, so that it is possible to enhance a performance of the apparatus, and to miniaturize and consolidate the apparatus. This is because, in the modulation type discrimination apparatus of the present invention, the discrimination of the modulation type is performed by means of extracting and analyzing the characteristic possessed by the reception signal, and there is provided the elements storage circuit for storing and extracting the communication elements obtained in the discrimination processing course.

An eighth effect is the fact that it is possible to enhance a reliability of the modulation type discrimination apparatus. This is because, as explained in connection with the embodiments of the present invention, the modulation type discrimination processing can be realized by the digital signal processing technique, so that it is difficult to be influenced by an external environment in contrast to a case of the analog type. Further, this is because no maintenance is required.

What is claimed is:

1. An automatic modulation type discrimination apparatus for receiving a reception signal having unknown communication elements and discriminating a modulation type of the reception signal, comprising:

analog/digital modulation type discrimination means for extracting and analyzing a predetermined characteristic from the reception signal and discriminating whether the modulation type of the reception signal is an analog modulation type or a digital modulation type;

analog modulation type discrimination means for, in a case where the reception signal is discriminated to be a signal of the analog modulation type, receiving the discriminated reception signal and discriminating whether the discriminated reception signal is an AM signal or an FM signal;

the analog/digital modulation type discrimination means including discrimination means for, in a case where the modulation type of the reception signal is discriminated to be the digital modulation type, discriminating whether the reception signal is a linear modulation type signal or a nonlinear modulation type signal;

linear modulation type discrimination means for, in a case where the reception signal is discriminated to be a linear modulation signal of the digital modulation type, receiving the discriminated reception signal and discriminating whether the discriminated reception signal is a 16 QAM signal, a BPSK signal, a QPSK signal, a $\pi/4$-shift QPSK signal, an 8-PSK signal, an M-ary PSK signal of multi-level exceeding 8-levels (where, M is a positive integer) or an M-ary QAM signal of multi-level exceeding 16-levels; and non-linear modulation type discrimination means for, in a case where the reception signal was discriminated to be a non-linear modulation signal by of the digital modulation type, receiving the discriminated reception signal and discriminating whether the discriminated reception signal is an M-ary FSK signal of multi-level exceeding 2-levels, a 2-FSK signal, an MSK signal or a GMSK signal, an envelope, a symbol clock and a spectrum characteristic of the reception signal being used as the predetermined characteristic.

2. An automatic modulation type discrimination apparatus set forth in claim 1, wherein the analog/digital modulation type discrimination means comprises:

a first envelope detection portion for detecting the envelope from the reception signal;

a first envelope fluctuation determination portion for, after integrating the detected envelope for a specified time, computing its average value and extracting an envelope fluctuation characteristic by computing a standard deviation of an amplitude distribution characteristic;

a first symbol clock extraction portion for extracting the symbol clock from the reception signal;

a symbol clock determination portion for determining an existence/nonexistence of the symbol clock from an output of the symbol clock extraction portion;

a first spectrum analysis portion for extracting a spectrum waveform of the reception signal and analyzing its characteristic; and a first modulation type determination portion for, by a characteristic detection result by the first envelope fluctuation determination portion and the symbol clock determination portion and an analysis result of the reception signal by the first spectrum analysis portion, discriminating whether the reception signal is the analog modulation type, the linear modulation type by digital modulation type or the non-linear modulation type by digital modulation type.

3. An automatic modulation type discrimination apparatus set forth in claim 2, wherein the analog modulation type discrimination means includes:

a carrier wave extraction portion for extracting a carrier wave of the reception signal;

a side band spectrum detection portion for detecting a symmetric property of a side band spectrum of the reception signal;

a signal band detection portion for detecting a signal band of the reception signal and analyzing a spectrum shape of the reception signal;

a second envelope detection portion for detecting an envelope of the reception signal;

a second envelope fluctuation determination portion for extracting an envelope fluctuation from the detected envelope;

a second modulation type determination portion for, by using a characteristic extraction and an analysis result of the reception signal from the carrier wave extraction portion, the side band spectrum detection portion, the signal band detection portion and the second envelope fluctuation determination portion, discriminating whether the reception signal is the AM signal, the FM signal or an unknown (unclear) signal not capable of being determined as either of the former signals; and a first backtracking portion for storing a branch point (branch) of each determination control processing in each of the portions and, in a case where the reception signal is discriminated to be the unknown signal, switching the unknown signal such that a processing for a different modulation type discrimination is performed again by returning to that branch point.

4. An automatic modulation type discrimination apparatus set forth in claim 3, wherein the linear modulation type discrimination means comprises:

a second symbol clock extraction portion for regenerating and extracting a symbol clock from the reception signal;

a first re-sampling portion for re-sampling the reception signal on the basis of the extracted symbol clock and extracting an information-superimposed symbol clock;

a first amplitude distribution extraction portion for computing a symbol vector radius from an extraction result of the first re-sampling portion and extracting its amplitude distribution;

a third modulation type determination portion for, on the basis of an output result of the first amplitude distribution extraction portion, discriminating the 16 QAM signal and the M-ary QAM signal of multi-level exceeding 16-levels from a signal other than the former signals;

an assumed carrier wave synchronization processing portion to which the reception signal discriminated to be the signal other than the 16 QAM signal and the M-ary QAM signal is inputted and which performs a carrier wave synchronization processing by assuming the modulation type of the reception signal;

a second amplitude distribution extraction portion for receiving an output of the assumed carrier wave synchronization processing portion and extracting characteristics of an (odd number)-th signal symbol and an (even number)-th signal symbol;

a fourth modulation type determination portion for, from a convergence position, a number of convergence points and a characteristic extraction result of the amplitude distribution for every one symbol of the signal symbols after the assumed carrier wave synchronization processing, discriminating whether the reception signal is the BPSK signal, the QPSK signal, the π/4-shift QPSK signal, 8-PSK signal, the M-ary PSK signal of multi-level exceeding 8-levels or an unknown signal not corresponding to the former signals; and a second backtracking portion for storing a branch point (branch) of each determination processing in the fourth modulation type determination portion and, in a case where the reception signal is discriminated to be the unknown signal, switching the reception signal such that a processing for a different modulation type discrimination is performed again by returning to that branch point.

5. An automatic modulation type discrimination apparatus set forth in claim 3, wherein the linear modulation type discrimination means comprises:

a second symbol clock extraction portion for regenerating and extracting a symbol clock from the reception signal;

a first re-sampling portion for re-sampling the reception signal on the basis of the extracted symbol clock and extracting an information-superimposed symbol clock;

a first amplitude distribution extraction portion for computing a symbol vector radius from an extraction result of the first re-sampling portion and extracting its amplitude distribution;

a third amplitude distribution extraction portion for analyzing an amplitude distribution characteristic of the reception signal;

an eighth modulation type determination portion for, on the basis of an extraction result of the first amplitude distribution extraction portion and an analysis result of the third amplitude distribution extraction portion, discriminating whether the reception signal is the 16 QAM signal, the M-ary QAM signal of multi-level exceeding 16-levels, the BPSK signal, the QPSK signal, the π/4-shift QPSK signal, the 8-PSK signal, the M-ary PSK signal of multi-level exceeding 8-levels or an unknown signal not corresponding to the former signals; and a second backtracking portion for storing a branch point (branch) of each determination processing in the eighth modulation type determination portion and, in a case where the reception signal is discriminated to be the unknown signal, switching the reception signal such that a processing for a different modulation type discrimination is performed again by returning to that branch point.

6. An automatic modulation type discrimination apparatus set forth in claim 5, wherein the non-linear modulation type discrimination means comprises:

an FM detection portion for performing an FM detection processing for the reception signal;

a third symbol clock extraction portion for regenerating and extracting a symbol clock from an output of the FM detection portion;

a second re-sampling portion for performing a re-sampling processing of the reception signal on the basis of the extracted symbol clock;

a fourth amplitude distribution extraction portion for extracting an amplitude distribution for a multi-level number determination in the non-linear modulation type from a re-sampled signal;

a fifth modulation type determination portion for performing the multilevel number determination on the basis of an extraction result of the fourth amplitude distribution extraction portion and discriminating an M-ary FSK signal of multi-level exceeding 2-levels from a 2-FSK signal;

a modulation index detection portion for, on the basis of the symbol block extracted in the third symbol clock extraction portion, detecting a modulation index of the reception signal, for the reception signal discriminated to be a signal other than the M-ary FSK signal;

a sixth modulation type determination portion for, from the detected modulation index, discriminating the 2-FSK signal from a signal other than the former signal;

an intersymbol interference analysis portion for analyzing an intersymbol interference in time axis of the reception signal discriminated to be the signal other than the 2-FSK signal;

a second spectrum analysis portion for performing a spectrum analysis of the reception signal and analyzing an intersymbol interference in frequency axis;

a seventh modulation type determination portion for, on the basis of a characteristic extraction and an analysis result of the intersymbol interference analysis portion and the second spectrum analysis portion, discriminating the MSK signal and the GMSK signal from an unknown signal not capable of being judged as either of the former signals; and a third backtracking portion for storing a branch point (branch) of each determination processing in the seventh modulation type determination portion and, in a case where the reception signal is discriminated to be the unknown signal, switching the unknown signal such that a processing for a different modulation type discrimination is performed again by returning to that branch point.

7. An automatic modulation type discrimination apparatus set forth in claim 6, wherein the first, second, fourth and seventh modulation type determination portions improve a discrimination ability by performing a weighting processing for the characteristic extraction result.

8. An automatic modulation type discrimination apparatus set forth in claim 7, further comprising tuning error correction means provided in a front stage of the analog/digital modulation type discrimination means, the tuning error correction means comprising:

a third spectrum analysis portion for performing a spectrum extraction and analysis of the reception signal and detecting a center frequency or a carrier wave frequency of the reception signal; and a frequency correction portion for detecting a tuning error from the detected center frequency or carrier wave frequency and thereby performing an error correction.

9. An automatic modulation type discrimination apparatus set forth in claim 8, wherein first to third storage portions are connected respectively to the first to third backtracking portions, and each of the first to third backtracking portions recognizes, when the reception signal discriminated to be the unknown signal is inputted, that it is a signal other than the modulation type made an object, and stores the characteristic extraction and the analysis result of the reception signal, which are obtained in the discrimination course, to corresponding one of the first to third storage portions.

10. An automatic modulation type discrimination apparatus set forth in claim 9, further comprising:

elements storage portions that are connected respectively to the third symbol clock extraction portion and the modulation index detection portion in the non-linear modulation type discrimination means, wherein one of said elements storage portions is connected, in common, to the intersymbol interference analysis portion and the second spectrum analysis portion, and means for storing elements, including but not limited to symbol clock rate, modulation index and filter parameter, necessary for demodulating the reception signal respectively to a respective storage portion for each element.

11. An automatic modulation type discrimination apparatus set forth in claim 10, further comprising a fourth backtracking portion and a fourth storage portion connected to the first modulation type determination portion in the analog/digital modulation type discrimination means, wherein the reception signal is inputted to the fourth backtracking portion in a case where it cannot be discriminated as either of the analog modulation signal or the digital modulation signal, and the fourth backtracking portion causes communication elements extracted and analyzed in the analog/digital modulation type discrimination means to be stored to the fourth backtracking portion.

12. An automatic modulation type discrimination system having an automatic modulation type discrimination apparatus set forth in claim 11, the automatic modulation type discrimination apparatus being realized by a Digital Signal Processor/Central Processing Unit operating in compliance with a previously recorded program, the automatic modulation type discrimination system being characterized by comprising:

an Analog Digital Converter for quantizing an analog reception signal of intermediate frequency to a digital signal;

a Half Band Filter for performing an orthogonal transformation processing for converting a quantized signal of intermediate frequency into a complex signal of base band zone, a Low Pass Filter processing and a thinning processing of 2;

an NCO type oscillator module for compensating an error of tuning frequency;

a buffer for temporarily storing reception data and smoothly giving the reception data to the digital signal processor/central processing unit;

a clock signal generator; and a Programmable Logic Device for internally frequency-dividing a clock signal of the clock signal generator and supplying it to each element.

13. An automatic modulation type discrimination method for receiving a reception signal having unknown communication elements and discriminating a modulation type of the reception signal, comprising:

(a) extracting a predetermined characteristic from the reception signal;

(b) discriminating, based on the predetermined characteristics extracted at step (a), whether the modulation type of the reception signal is an analog modulation type or a digital modulation type; and (c) in a case where the reception signal is discriminated at (b) as being of the digital modulation type, determining whether the reception signal is of the linear modulation type or of the non-linear modulation type, wherein, the discrimination at step (b) as to whether the reception signal is the analog modulation type or the digital modulation type is performed by means of extracting and analyzing an existence/nonexistence of an envelope, an existence/nonexistence of a symbol clock and a spectrum shape of the reception signal as the predetermined characteristic.

14. An automatic modulation type discrimination method set forth in claim 13, in a case where the reception signal is discriminated at (b) to be the analog modulation type, further comprising discriminating whether the reception signal is an AM signal or an FM signal by extracting and analyzing, for the reception signal, an existence/nonexistence of a carrier wave signal, a symmetric property of a side band spectrum, a spectrum concentration property of the reception signal and an existence/nonexistence of an envelope fluctuation.

15. An automatic modulation type discrimination method set forth in claim 14, in a case where the reception signal is determined to be the linear modulation type of the digital modulation type, further comprising discriminating whether the reception signal is a 16 QAM signal, an M-ary QAM signal of multilevel exceeding 16-levels, a BPSK signal, a QPSK signal, a $\pi/4$-shift QPSK signal, an 8-PSK signal or an M-ary PSK signal or multi-level exceeding 8-levels by performing, for the reception signal, an extraction and an analysis concerning a distribution of a symbol vector radius by a signal symbol convergence characteristic before a carrier wave synchronization processing, a number of distances thereof, a convergence position of the signal after a carrier synchronization processing, a number of convergence points and a symbol convergence position characteristic of a convergence characteristic for every one symbol.

16. An automatic modulation type discrimination method set forth in claim 15, in a case where the reception signal is determined to be the non-linear modulation type of the digital modulation type, further comprising discriminating whether the reception signal is an M-ary FSK (where, $M \geqq 3$) signal, an FSK signal, an MSK signal or a GMSK signal by performing, for the reception signal, an extraction and an analysis concerning an amplitude distribution characteristic after an FM detection, a modulation index, an influence of an intersymbol interference and a kind of the intersymbol interference.

17. An automatic modulation type discrimination method set forth in claim 16, wherein, when the reception signal is discriminated as an unknown (unclear) signal not capable of being discriminated as to which modulation type it belongs, further comprising switching the processing such that a discrimination processing is realized by means of another discrimination using a backtracking technique.

18. An automatic modulation type discrimination method set forth in claim 17, wherein in the backtracking technique a determination point (branch) of a discrimination processing course is stored and a characteristic extraction result until that point of time is used, in a case where there are plural discrimination processing candidates it is possible to select a branch of the processing having a highest probability.

19. An automatic modulation type discrimination method set forth in claim 18, in a case where the reception signal is discriminated as the unknown (unclear) signal, further comprising performing a storage of communication elements of that reception signal until that point of time to make the unknown (unclear) signal a new object signal, and constructing a self-regeneration type data base.

20. An automatic modulation type discrimination method set forth in claim 19, the backtracking technique comprises tracing and storing a result, extracting various characteristics and analyzing results of the discrimination processing switching to another discrimination processing.

21. An automatic modulation type discrimination method for receiving a reception signal having unknown communication elements and discriminating a modulation type of the reception signal, comprising:

a first step of performing a predetermined characteristic extraction and analysis processing for the reception signal;

a second step of, on the basis of an extraction result and an analysis result, discriminating whether the reception signal is of an analog modulation type, a linear modulation type of the digital modulation type or a non-linear modulation type of the digital modulation type;

a third step of, in a case where in the second step the reception signal is determined to be one of the analog modulation type, performing a preselected characteristic extraction and analysis processing for the reception signal;

a fourth step of, on the basis of a characteristic extracted in the third step and an analysis result, determining whether the reception signal is an AM signal or an FM signal;

a fifth step of, in a case where in the fourth step the reception signal is determined to be an unknown (unclear) signal which is neither the AM signal nor the FM signal, performing a backtracking processing;

a sixth step of, in a case where in the second step the reception signal is determined to be of the linear modulation type of the digital modulation type, performing an extraction of a symbol clock or a re-sampling processing including the extraction of a symbol clock for the reception signal;

a seventh step of, on the basis of a result of the re-sampling processing, computing a symbol vector radius and, further, extracting a characteristic of its amplitude distribution;

an eighth step of, on the basis of an extracted characteristic of the amplitude distribution, determining whether the reception signal is a 16 QAM signal and an M-ary QAM signal of multi-level exceeding 16-levels or a signal other than the former signals;

a ninth step of, in a case where in the eighth step the reception signal is determined to be a linear modulation signal other than the 16 QAM signal and the M-ary QAM signal, assuming the modulation type and performing an assumed carrier wave synchronization processing;

a tenth step of, from a processing result obtained by the ninth step, extracting an amplitude distributions of an (odd number)-th signal symbol and an (even number)-th signal symbol;

an eleventh step of, on the basis of the amplitude distributions extracted in the tenth step, determining whether the reception signal is a BPSK signal, a QPSK signal, a π/4-shift QPSK signal, an 8-PSK signal or an M-ary PSK signal of multi-level exceeding 8-levels;

a twelfth step of, in a case where in the eleventh step the reception signal is determined to be an unknown signal which is none of the BPSK signal, the QPSK signal, the π/4-shift QPSK signal, the 8-PSK signal and the M-ary PSK signal, performing a backtracking processing;

a thirteenth step of, in a case where in the second step the reception signal is determined to be the non-linear modulation type of the digital modulation type, performing an FM detection, a symbol clock extraction and a re-sampling processing;

a fourteenth step of, from a signal re-sampled in the thirteenth step, performing an amplitude distribution extraction processing for a multi-level number determination in the non-linear modulation type;

a fifteenth step of, by performing the multi-level number determination on the basis of an amplitude distribution extracted in the fourteenth step, determining whether the reception signal is an M-ary FSK signal of multi-level exceeding 2-levels or a signal other than the former signal;

a sixteenth step of, in a case where in the fifteenth step the reception signal is determined to be the signal other than the M-ary FSK signal, detecting a modulation index of the reception signal on the basis of a symbol clock extracted in the thirteenth step;

a seventeenth step of, on the basis of the modulation index detected in the sixteenth step, determining whether the reception signal is a 2-FSK signal or a signal other than the former signal;

an eighteenth step of, in a case where in the seventeenth step the reception signal is determined to be the signal other than the 2-FSK signal, analyzing an intersymbol interference in a time axis and an intersymbol interference in a frequency axis;

a nineteenth step of, by an analysis result in the eighteenth step, determining whether the reception signal is an MSK signal, a GMSK signal or an unknown signal; and a twentieth step of, in a case where in the nineteenth step the reception signal is determined to be the unknown signal, performing a backtracking processing.

22. A recording medium in which a program for causing a computer to implement the first to twentieth steps set forth in claim 21 has been recorded.

23. An automatic modulation type discrimination method for receiving a reception signal having unknown communication elements and discriminating a modulation type of the reception signal, comprising:

a first step of performing a predetermined characteristic extraction and analysis processing for the reception signal;

a second step of, on the basis of an extraction result and an analysis result, discriminating whether the reception signal is an FM signal of an analog modulation type, an AM signal of the analog modulation type, a linear modulation type of a digital modulation type or a non-linear modulation type of the digital modulation type;

a third step of, in a case where in the second step the reception signal is determined to be of the linear modulation type of the digital modulation type, performing an extraction of a symbol clock or a re-sampling processing including the extraction of a symbol clock for the reception signal;

a fourth step of, on the basis of a result of the re-sampling processing, computing a symbol vector radius and, further, extracting a characteristic of its amplitude distribution;

a fifth step of, on the basis of an extracted characteristic of the amplitude distribution, determining whether the reception signal is a 16 QAM signal and an M-ary QAM signal of multi-level exceeding 16-levels or a signal other than the former signals;

a sixth step of, in a case where in the fifth step the reception signal is determined to be a linear modulation signal other than the 16 QAM signal and the M-ary QAM signal, assuming the modulation type and performing an assumed carrier wave synchronization processing;

a seventh step of, from a processing result obtained by the sixth step, extracting an amplitude distribution of an (odd number)-th signal symbol and an (even number)-th signal symbol;

an eighth step of, on the basis of the amplitude distributions extracted in the seventh step, determining whether the reception signal is a BPSK signal, a QPSK signal, a π/4-shift QPSK signal, an 8-PSK signal or an M-ary PSK signal of multi-level exceeding 8-levels;

a ninth step of, in a case where in the eighth step the reception signal is determined to be an unknown signal which was none of the BPSK signal, the QPSK signal, the π/4-shift QPSK signal, then 8-PSK signal and the M-ary PSK signal, performing a backtracking processing;

a tenth step of, in a case where in the second step the reception signal is determined to be the non-linear modulation type by digital modulation type, performing an FM detection, a symbol clock extraction and a re-sampling processing;

an eleventh step of, from a signal re-sampled in the tenth step, performing an amplitude distribution extraction processing for a multi-level number determination in the non-linear modulation type;

a twelfth step of, by performing the multi-level number determination on the basis of an amplitude distribution extracted in the eleventh step, determining whether the reception signal is an M-ary FSK signal of multi-level exceeding 2-levels or a signal other than the former signal;

a thirteenth step of, in a case where in the twelfth step the reception signal was determined to be the signal other than the M-ary FSK signal, detecting a modulation index of the reception signal on the basis of a symbol clock extracted in the tenth step;

a fourteenth step of, on the basis of the modulation index detected in the thirteenth step, determining whether the reception signal is a 2-FSK signal or a signal other than the former signal;

a fifteenth step of, in a case where in the fourteenth step the reception signal is determined to be the signal other than the 2-FSK signal, analyzing an intersymbol interference in a time axis and an intersymbol interference in a frequency axis;

a sixteenth step of, by an analysis result in the fifteenth step, determining whether the reception signal is an MSK signal, a GMSK signal or an unknown signal; and a seventeenth step of, in a case where in the sixteenth step the reception signal is determined to be the unknown signal, performing a backtracking processing.

24. A recording medium in which a program for causing a computer to implement the first to seventeenth steps set forth in claim 23 has been recorded.

25. An automatic modulation type discrimination apparatus for receiving a reception signal having unknown communication elements and discriminating a modulation type of the reception signal, comprising: analog/digital modulation type discrimination means for discriminating whether the reception signal is a signal of the analog modulation type or of the digital modulation type, wherein the analog/digital modulation type discrimination means comprises:

a first envelope detection portion for detecting an envelope from the reception signal;

an envelope fluctuation determination portion for determining whether the detected envelope is a constant envelope or an inconstant envelope;

a first FM detection portion for performing an FM detection processing for a signal determined as the constant envelope;

a first symbol clock extraction portion for extracting symbol clocks from the signal subjected to the FM detection processing and a signal determined as the inconstant envelope; and a first modulation type determination portion for, from an amplitude fluctuation characteristic and an existence/nonexistence of the symbol clock, discriminating whether the reception signal is an FM signal of the analog modulation type, an AM signal of the analog modulation type, a linear modulation type by the digital modulation type or a non-linear modulation type by the digital modulation type, the automatic modulation type discrimination apparatus further comprising linear modulation type discrimination means for, in a case where the reception signal is discriminated to be the linear modulation signal of the digital modulation type, receiving the discriminated reception signal and discriminating whether the discriminated reception signal is a 16 QAM signal, a BPSK signal, a QPSK signal, $\pi/4$-shift QPSK signal, an 8-PSK signal, an M-ary PSK signal of multi-level exceeding 8-levels or an M-ary PSK signal of multi-level exceeding 16-levels, and non-linear modulation type discrimination means for, in a case where the reception signal is discriminated to be the non-linear modulation signal of the digital modulation type, receiving the discriminated reception signal and discriminating whether the discriminated reception signal is an M-ary FSK signal of multi-level exceeding 2-levels, a 2-FSK signal, an MSK signal or a GMSK signal.

26. An automatic modulation type discrimination apparatus set forth in claim 25, wherein the linear modulation type discrimination means comprises:

a second symbol clock extraction portion for regenerating and extracting a symbol clock from the reception signal;

a first re-sampling portion for re-sampling the reception signal on the basis of the extracted symbol clock and extracting an information-superimposed symbol clock;

a first amplitude distribution extraction portion for computing a symbol vector radius from an extraction result of the first re-sampling portion and extracting its amplitude distribution;

a second modulation type determination portion for, on the basis of an output result of the first amplitude distribution extraction portion, discriminating the 16 QAM signal and the M-ary QAM signal of multi-level exceeding 16-levels from a signal other than the former signals;

an assumed carrier wave synchronization processing portion to which the reception signal discriminated to be the signal other than the 16 QAM signal and the M-ary QAM signal is inputted and which performs a carrier wave synchronization processing by assuming the modulation type of the reception signal;

a second amplitude distribution extraction portion for receiving an output of the assumed carrier wave synchronization processing portion and extracting characteristics of an (odd number)-th signal symbol and an (even number)-th signal symbol;

a third modulation type determination portion for, from a convergence position, a number of convergence points and a characteristic extraction result of the amplitude distribution for every one symbol of the signal symbols after the assumed carrier wave synchronization processing, discriminating whether the reception signal is the BPSK signal, the QPSK signal, the $\pi/4$-shift QPSK signal, 8-PSK signal, the M-ary PSK signal of multi-level exceeding 8-levels or an unknown signal not corresponding to the former signals; and a first backtracking portion for storing a branch point (branch) of each determination processing in the third modulation type determination portion and, in a case where the reception signal is discriminated to be the unknown signal, switching the reception signal such that a processing for a different modulation type discrimination is performed again by returning to that branch point.

27. An automatic modulation type discrimination apparatus set forth in claim 25, wherein the linear modulation type discrimination means comprises:

a second symbol clock extraction portion for regenerating and extracting a symbol clock from the reception signal;

a first re-sampling portion for re-sampling the reception signal on the basis of the extracted symbol clock and extracting an information-superimposed symbol clock;

a first amplitude distribution extraction portion for computing a symbol vector radius from an extraction result of the first re-sampling portion and extracting its amplitude distribution;

a third amplitude distribution extraction portion for analyzing an amplitude distribution characteristic of the reception signal;

a fourth modulation type determination portion for, on the basis of an extraction result of the first amplitude distribution extraction portion and an analysis result of the third amplitude distribution extraction portion, discriminating whether the reception signal is the 16 QAM signal, the M-ary QAM signal of multi-level exceeding 16-levels, the BPSK signal, the QPSK signal, the $\pi/4$-shift QPSK signal, the 8-PSK signal, the M-ary PSK signal of multi-level exceeding 8-levels or an unknown signal not corresponding to the former signals; and a first backtracking portion for storing a branch point (branch) of each determination processing in the fourth modulation type determination portion and, in a case where the reception signal is discriminated to be the unknown signal, switching the reception signal such that a processing for a different modulation type discrimination is performed again by returning to that branch point.

28. An automatic modulation type discrimination apparatus set forth in claim 27, wherein the non-linear modulation type discrimination means comprises:

an FM detection portion for performing an FM detection processing for the reception signal;

a third symbol clock extraction portion for regenerating extracting a symbol clock from an output of the FM detection portion;

a second re-sampling portion for performing a re-sampling processing of the reception signal on the basis of the extracted symbol clock;

a fourth amplitude distribution extraction portion for extracting an amplitude distribution for a multi-level number determination in the non-linear modulation type from a re-sampled signal;

a fifth modulation type determination portion for performing the multilevel number determination on the basis of an extraction result of the fourth amplitude distribution extraction portion and discriminating an M-ary FSK signal of multi-level exceeding 2-levels from a 2-FSK signal;

a modulation index detection portion for, on the basis of the symbol block extracted in the third symbol clock extraction portion, detecting a modulation index of the reception signal, for the reception signal discriminated to be a signal other than the M-ary FSK signal;

a sixth modulation type determination portion for, from the detected modulation index, discriminating the 2-FSK signal from a signal other than the former signal;

an intersymbol interference analysis portion for analyzing an intersymbol interference in time axis of the reception signal discriminated to be the signal other than the 2-FSK signal;

a first spectrum analysis portion for performing a spectrum analysis of the reception signal and analyzing an intersymbol interference in a frequency axis;

a seventh modulation type determination portion for, on the basis of a characteristic extraction and an analysis result of the intersymbol interference analysis portion and the first spectrum analysis portion, discriminating the MSK signal and the GMSK signal from an unknown signal not capable of being judged as either of the former signals; and a second backtracking portion for storing a branch point (branch) of each determination processing in the seventh modulation type determination portion and, in a case where the reception signal is discriminated to be the unknown signal, switching the unknown signal such that a processing for a different modulation type discrimination is performed again by returning to that branch point.

29. An automatic modulation type discrimination apparatus set forth in claim 28, wherein the third and seventh modulation type determination portions improve a discrimination ability by performing a weighting processing for the characteristic detection result.

30. An automatic modulation type discrimination apparatus set forth in claim 29, further comprising tuning error correction means provided in a front stage of the analog/digital modulation type discrimination means, wherein the tuning error correction means comprises:

a second spectrum analysis portion for performing a spectrum extraction and analysis of the reception signal and detecting a center frequency or a carrier wave frequency of the reception signal; and a frequency correction portion for detecting a tuning error from the detected center frequency or carrier wave frequency and thereby performing an error correction.

31. An automatic modulation type discrimination apparatus set forth in claim 30, wherein the first and second storage portions are connected respectively to the first and second backtracking portions, and each of the first and second backtracking portions recognizes, when the reception signal discriminated to be the unknown signal is inputted, that it is a signal other than the modulation type made an object, and stores the characteristic extraction and the analysis result of the reception signal, which are obtained in the discrimination course, to corresponding one of the first and second storage portions.

32. An automatic modulation type discrimination apparatus set forth in claim 31, further comprising elements storage portions connected respectively to the third symbol clock extraction portion and the modulation index detection portion in the non-linear modulation type discrimination means, wherein one of said elements storage portions is connected, in common, to the intersymbol interference analysis portion and the first spectrum analysis portion, and means for storing elements, including but not limited to symbol clock rate, modulation index and filter parameter, necessary for demodulating the reception signal respectively to a respective storage portion for each element.

33. An automatic modulation type discrimination apparatus set forth in claim 32, further comprising a third backtracking portion and a third storage portion connected to the first modulation type determination portion in the analog/digital modulation type discrimination means, wherein the reception signal is inputted to the third backtracking portion in a case where it cannot be discriminated as either of the analog modulation signal or the digital modulation signal, and the third backtracking portion causes communication elements extracted and analyzed in the analog/digital modulation type discrimination means to be stored to the third backtracking portion.

34. An automatic modulation type discrimination system having an automatic modulation type discrimination apparatus set forth in claim 33, the automatic modulation type discrimination apparatus being realized by a Digital Signal Processor/Central Processing Unit operating in compliance with a previously recorded program, the automatic modulation type discrimination system being characterized by comprising:

an Analog Digital Converter for quantizing an analog reception signal of intermediate frequency to a digital signal;

- a Half Band Filter for performing an orthogonal transformation processing for converting a quantized signal of intermediate frequency into a complex signal of base band zone, a Low Pass Filter processing and a thinning processing of 2;
- an NCO type oscillator module for compensating an error of tuning frequency;
- a buffer for temporarily storing reception data and smoothly giving the reception data to the digital signal processor/central processing unit;
- a clock signal generator; and
- a Programmable Logic Device for internally frequency-dividing a clock signal of the clock signal generator and supplying it to each element.

35. An automatic modulation type discrimination method for receiving a reception signal having unknown communication elements and discriminating a modulation type of the reception signal, comprising:

- a first step of detecting an envelope for the reception signal;
- a second step of determining an existence/nonexistence of an envelope fluctuation concerning the detected envelope;
- a third step of performing an FM detection processing for a signal determined that no envelope exists;
- a fourth step of extracting a symbol clock from a signal subjected to the FM detection processing;
- a fifth step of extracting a symbol clock from a signal determined that the envelope exists;
- a sixth step of, from an amplitude fluctuation characteristic and an existence/nonexistence of the symbol clock, discriminating whether the reception signal is an AM modulation signal, an FM modulation signal, a linear modulation signal of a digital modulation type or a non-linear modulation signal of the digital modulation type;
- a seventh step of, in a case where in the sixth step the reception signal is determined to be the linear modulation type of the digital modulation type, performing an extraction of a symbol clock or a re-sampling processing including the extraction of a symbol clock for the reception signal;
- an eighth step of, on the basis of a result of the re-sampling processing, computing a symbol vector radius and, further, extracting a characteristic of its amplitude distribution;
- a ninth step of, on the basis of an extracted characteristic of the amplitude distribution, determining whether the reception signal is a 16 QAM signal and an M-ary QAM signal of multi-level exceeding 16-levels or a signal other than the former signals;
- a tenth step of, in a case where in the ninth step the reception signal is determined to be a linear modulation signal other than the 16 QAM signal and the M-ary QAM signal, assuming the modulation type and performing an assumed carrier wave synchronization processing;
- an eleventh step of, from a processing result obtained by the tenth step, extracting an amplitude distributions of an (odd number)-th signal symbol and an (even number)-th signal symbol;
- a twelfth step of, on the basis of the amplitude distributions extracted in the eleventh step, determining whether the reception signal is a BPSK signal, a QPSK signal, a $\pi/4$-shift QPSK signal, an 8-PSK signal or an M-ary PSK signal of multi-level exceeding 8-levels;
- a thirteenth step of, in a case where in the twelfth step the reception signal is determined to be an unknown signal which is none of a BPSK signal, a QPSK signal, a $\pi/4$-shift QPSK signal, an 8-PSK signal and an M-ary PSK signal, performing a backtracking processing;
- a fourteenth step of, in a case where in the sixth step the reception signal is determined to be the non-linear modulation type by the digital modulation type, performing an FM detection, a symbol clock extraction and a re-sampling processing;
- a fifteenth step of, from a signal re-sampled in the fourteenth step, performing an amplitude distribution extraction processing for a multi-level number determination in the non-linear modulation type;
- a sixteenth step of, by performing the multi-level number determination on the basis of an amplitude distribution extracted in the fifteenth step, determining whether the reception signal is an M-ary FSK signal of multi-level exceeding 2-levels or a signal other than the former signal;
- a seventeenth step of, in a case where in the sixteenth step the reception signal is determined to be the signal other than the M-ary FSK signal, detecting a modulation index of the reception signal on the basis of a symbol clock extracted in the fourteenth step;
- an eighteenth step of, on the basis of the modulation index detected in the seventeenth step, determining whether the reception signal is a 2-FSK signal or a signal other than the former signal;
- a nineteenth step of, in a case where in the eighteenth step the reception signal is determined to be the signal other than the 2-FSK signal, analyzing an intersymbol interference in a time axis and an intersymbol interference in a frequency axis;
- a twentieth step of, by an analysis result in the nineteenth step, determining whether the reception signal is an MSK signal, a GMSK signal or an unknown signal; and
- a twenty-first step of, in a case where in the twentieth step the reception signal is determined to be the unknown signal, performing a backtracking processing.

36. A recording medium in which a program for causing a computer to implement the first to twenty-first steps set forth in claim 35 has been recorded.

* * * * *

UNITED STATES PATENT AND TRADEMARK OFFICE

CERTIFICATE OF CORRECTION

PATENT NO. : 6,934,342 B1 Page 1 of 1
APPLICATION NO. : 09/659767
DATED : August 23, 2005
INVENTOR(S) : Hiroyuki Ishii et al.

It is certified that error appears in the above-identified patent and that said Letters Patent is hereby corrected as shown below:

On the face of the Patent in the Assignee Field (73):

Please add: Anritsu Corporation

Signed and Sealed this

Twenty-ninth Day of August, 2006

JON W. DUDAS
*Director of the United States Patent and Trademark Office*